United States Patent
Kitaura et al.

(10) Patent No.: US 11,467,001 B2
(45) Date of Patent: Oct. 11, 2022

(54) ADJUSTMENT VALUE CALCULATION METHOD

(71) Applicant: FUJITSU LIMITED, Kawasaki (JP)

(72) Inventors: Asako Kitaura, Kawasaki (JP); Takushi Fujita, Chigasaki (JP)

(73) Assignee: FUJITSU LIMITED, Kawasaki (JP)

( * ) Notice: Subject to any disclaimer, the term of this patent is extended or adjusted under 35 U.S.C. 154(b) by 142 days.

(21) Appl. No.: 17/003,842

(22) Filed: Aug. 26, 2020

(65) Prior Publication Data
US 2021/0095992 A1    Apr. 1, 2021

(30) Foreign Application Priority Data
Sep. 27, 2019 (JP) .............................. JP2019-176985

(51) Int. Cl.
*G01C 21/00* (2006.01)
*G06T 7/73* (2017.01)

(52) U.S. Cl.
CPC ............ *G01C 21/3859* (2020.08); *G06T 7/74* (2017.01); *G06T 2207/10016* (2013.01); *G06T 2207/30252* (2013.01)

(58) Field of Classification Search
CPC .................. G01C 21/3859; G06T 7/74; G06T 2207/10016; G06T 2207/30252
See application file for complete search history.

(56) References Cited

U.S. PATENT DOCUMENTS

| 2012/0257018 A1* | 10/2012 | Shigemura ............. G02B 30/27 348/46 |
| 2018/0225524 A1 | 8/2018 | Fujita |
| 2020/0036952 A1* | 1/2020 | Iwane .................... G06T 15/205 |

(Continued)

FOREIGN PATENT DOCUMENTS

| JP | 2008-107941 | 5/2008 |
| JP | 2018-081008 A | 5/2018 |

(Continued)

OTHER PUBLICATIONS

The extended European search report of European Patent Application No. 20193834.7 dated Jan. 29, 2021, 7 pages.

(Continued)

*Primary Examiner* — John J Lee
(74) *Attorney, Agent, or Firm* — Maschoff Brennan

(57) ABSTRACT

A non-transitory, computer-readable storage medium has stored therein a program for causing a processor to execute a process that includes: adjusting a difference between a first environment map created based on a feature of a given image among captured first time-series images and a second environment map created based on a feature of a given image among second time-series images captured separately from the first time-series images; comparing a position of an image related to a position and orientation calculated based on information on the first environment map with a position of an image related to a position and orientation calculated based on information on the second environment map, and calculating an adjustment value for adjusting a difference between the first environment map and the second environment map based on a result of the comparison.

7 Claims, 20 Drawing Sheets

(56) References Cited

U.S. PATENT DOCUMENTS

2020/0134866 A1     4/2020  Kitaura et al.
2020/0290509 A1*    9/2020  Pandit .................. G05D 1/0088

FOREIGN PATENT DOCUMENTS

JP      2018-128314     8/2018
JP      2020-067439     4/2020

OTHER PUBLICATIONS

R. Wang et al., "Stereo DSO: Large-Scale Direct Sparse Visual Odometry with Stereo Cameras", 2017 IEEE International Conference on Computer Vision (ICCV), IEEE, XP033283264, DOI: 10.1109/ICCV.2017.421, [retrieved on Dec. 22, 2017], pp. 3923-3931, Oct. 22, 2017.

R. Castle et al., "Video-rate Localization in Multiple Maps for Wearable Augmented Reality", Wearable Computers, ISWC 2008. 12th IEEE International Symposium on, IEEE, Piscataway, NJ, USA, XP031452978, pp. 15-22, Sep. 28, 2008.

\* cited by examiner

ADJUSTMENT VALUE CALCULATION METHOD

CROSS-REFERENCE TO RELATED APPLICATION

This application is based upon and claims the benefit of priority of the prior Japanese Patent Application No. 2019-176985, filed on Sep. 27, 2019, the entire contents of which are incorporated herein by reference.

FIELD

The embodiments discussed herein are related to an adjustment value calculation method and an adjustment value calculation program for calculating an adjustment value of an environment map.

BACKGROUND

In the related art, there is a technique called simultaneous localization and mapping (SLAM) that uses data related to surrounding conditions acquired while a moving object is moving as input and simultaneously creates a traveling route of the moving object and a surrounding environment map. In addition, among the SLAM techniques, a technique that estimates a camera position and orientation when the moving object is traveling by using a video captured by the moving object as input is called visual-SLAM (hereinafter, referred to as "V-SLAM").

V-SLAM is a technology that may estimate and create a traveling route of an own vehicle (position and orientation of own vehicle) and a surrounding environment map (three-dimensional position map of image feature point group of surrounding subjects, hereinafter referred to as "environment map") by using a video captured by a vehicle-mounted camera as input and using changes in a subject in the captured video. The position and orientation of the own vehicle may be estimated from a video of a regular vehicle.

As a related prior art, there is a technique in which an environment map for a position and orientation estimation by V-SLAM is created in advance, the environment map is read and used, and in a case where the environment changes due to aging or the like, the environment map is updated using the acquired image feature information.

In addition, as another related prior art, there is a technique of using position information by a global navigation satellite system (GNSS) acquired simultaneously with an image for correction in order to remove the influence of error accumulation in the position and orientation estimation by V-SLAM.

Examples of the related art include Japanese Laid-open Patent Publication No. 2018-128314 and Japanese Patent Application No. 2018-202252.

SUMMARY

According to an aspect of the embodiments, a non-transitory, computer-readable storage medium has stored therein a program for causing a processor to execute a process that includes adjusting a difference between a first environment map created based on a feature of a given image among captured first time-series images and a second environment map created based on a feature of a given image among second time-series images captured separately from the first time-series images; comparing a position of an image related to a position and orientation calculated based on information on the first environment map with a position of an image related to a position and orientation calculated based on information on the second environment map; and calculating an adjustment value for adjusting a difference between the first environment map and the second environment map based on a result of the comparing.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
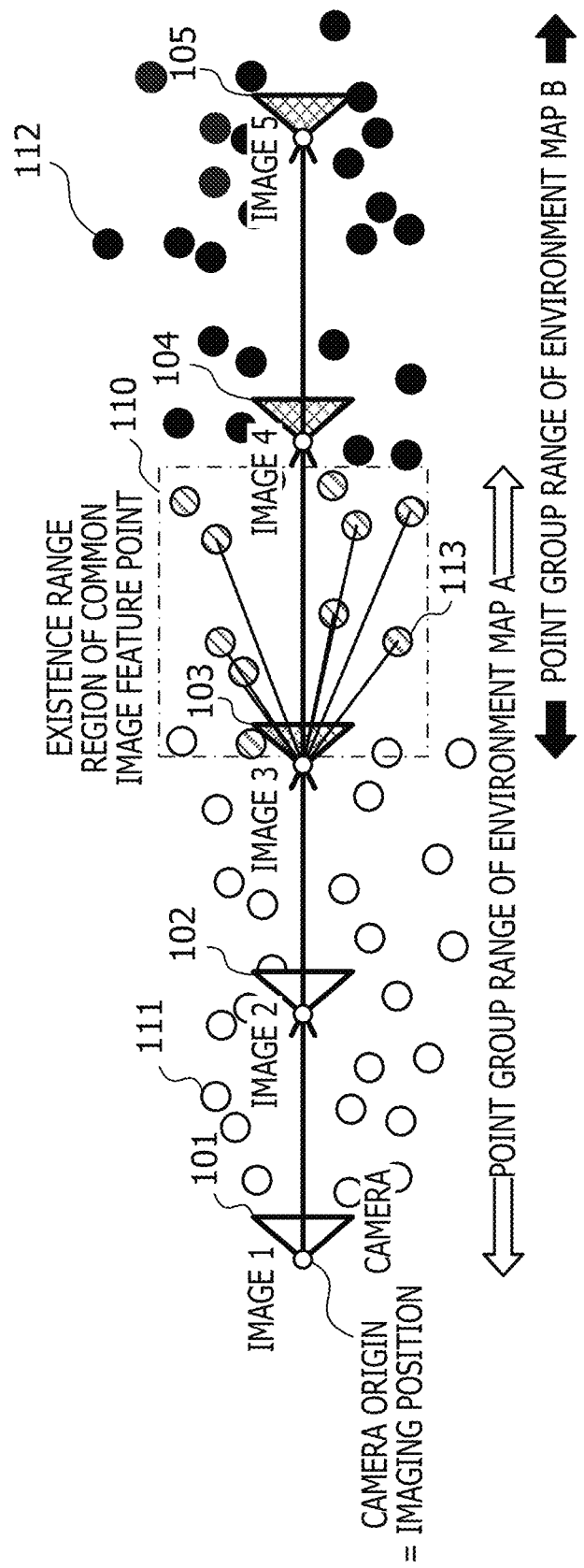
FIG. 1 is an explanatory diagram schematically illustrating an example of an overhead bird's-eye view of an ideal environment map (without a position error)

In the related art, in a case where the GNSS information is used, when creating the environment map by the V-SLAM, the GNSS information normally includes an error. Therefore, a deviation occurs at a boundary portion of each environment map due to an influence of the error of the used GNSS information. Therefore, there is a problem that a gap with a sudden large change in a position is generated when the map is switched at the boundary of the map for each region.

Hereinafter, embodiments of an environment map adjustment value calculation method and an environment map adjustment value calculation program according to the present disclosure will be described in detail with reference to the drawings.

Embodiments

First, an outline of an environment map adjustment value calculation method and an environment map adjustment value calculation program according to the present embodiment will be described with reference to FIGS. 1 to 3.

When performing a service such as collecting (probing) data (video) of a vehicle-mounted device and a drive recorder of a moving regular vehicle, acquiring information on features and moving objects over and around the road from the collected video of the regular vehicle, updating traffic information and road obstacle information, updating a high-precision map for autonomous driving, and analyzing a surrounding condition at the time of imaging for autonomous driving, it is required to accurately know a camera position and orientation (imaging position and orientation of video) at which a vehicle-mounted image (video) is captured as a premise for using the service using the video of the regular vehicle.

Therefore, the imaging position and orientation of an image captured by a camera mounted on a moving object such as a regular vehicle are obtained with high accuracy in a real coordinate system. Here, the real coordinate system is also referred to as a world coordinate system, is a coordinate system capable of uniquely expressing a location and a direction in the world, and latitude, longitude, altitude, direction, and the like are defined. There are various methods of defining the real coordinate system, and any of these may be mutually converted.

SLAM is a normal term for a technique for simultaneously creating a traveling route of an own vehicle (position and orientation of own vehicle) and a surrounding environment map (such as three-dimensional position map of surrounding objects) by using the vehicle-mounted data, such as laser imaging detection and ranging (LiDAR) data, on surrounding conditions acquired during the movement as input.

V-SLAM extracts a large number of image features that may be associated with each point in a space from continuous images (moving images) continuously in time-series and captured by a moving camera. Then, each of the extracted image features is associated with each other between the continuous images by using the similarity, and a solution is obtained for a geometric condition to be satisfied between all the continuous images. As a result, the position of each image feature in the space, and the imaging position and orientation of each image may be obtained.

In normal V-SLAM of the related art, a relative change in position and orientation from the start time point of V-SLAM processing is obtained while creating an "environment map" including position information on image features in space. However, for example, as in the prior art according to Japanese Patent Application No. 2018-202252, it is also possible to obtain the position and orientation in the real coordinate system and the environment map in the real coordinate system by obtaining the position of each image including the start time point by separate means and using the position of each image to determine and calculate the coordinate system for the initial calculation, and to calculate relative change in position and orientation and environment maps.

Here, as separate means for obtaining the position, position information ("GNSS information") by GNSS such as GPS may be used. By performing the V-SLAM processing using the GNSS information, the position and orientation in the real coordinate system may be estimated including the orientation that may not be estimated by the GNSS information alone. However, since the GNSS information normally includes an error of several meters, the obtained position and orientation and the environment map simultaneously obtained include an error reflecting the error of the GNSS information used. Therefore, the results of obtaining the position and orientation in the real coordinate system by the V-SLAM using the GNSS information at the time of imaging the respective images for the images obtained by separately imaging substantially the same route have different errors, and it is not possible to obtain an accurate mutual relative positional relationship.

Incidentally, according to the related art, instead of creating the environment map, a position and orientation of the camera of the video of the moving object may be estimated by inputting an environment map created in advance from a video obtained by imaging substantially the same route and GNSS information. In this estimation, first, as a preliminary preparation, an "environment map" having positions of the image features in the real coordinate system as data is created for a large number of "image features" that may be extracted from an image by processing and may be associated with one point in the real coordinate system.

Next, a large number of "image features" are extracted from the image for which the imaging position and orientation are to be estimated, and these "image features" are associated with image features recorded in the input "environment map" in consideration of similarity. Then, a solution of the geometric condition to be satisfied by these image features is obtained to calculate the position and orientation at which the image is captured. The position and orientation calculated by this method include an error of the input environment map, in other words, an error of the GNSS information used when the input environment map is created.

Incidentally, in a case where a wide-area environment map is created, it is normally difficult to create an entire environment map at once. Therefore, create separate environment maps for each divided area, taking care not to create gaps in the boundaries. By using such an environment map, the environment map can be used in a wide and seamless manner while switching the environment map when crossing the boundary.

Here, in a case where the environment map for each region is created using GNSS information, as described above, since the GNSS information normally includes an error, a position error, in other words, a "positional deviation" occurs in a boundary portion of the environment map. Therefore, a gap occurs when the map is switched at the boundary of the map for each region. This is because a normal GNSS such as a car navigation system has a position error of several meters and the amount of position error varies depending on a traveling date and time or a location. Therefore, even when the data is acquired at the same location, the position is different for each acquisition timing. As a result, in the environment maps created from the different images and the GNSS information, positional deviations occur even at the same location.

Figure 2:
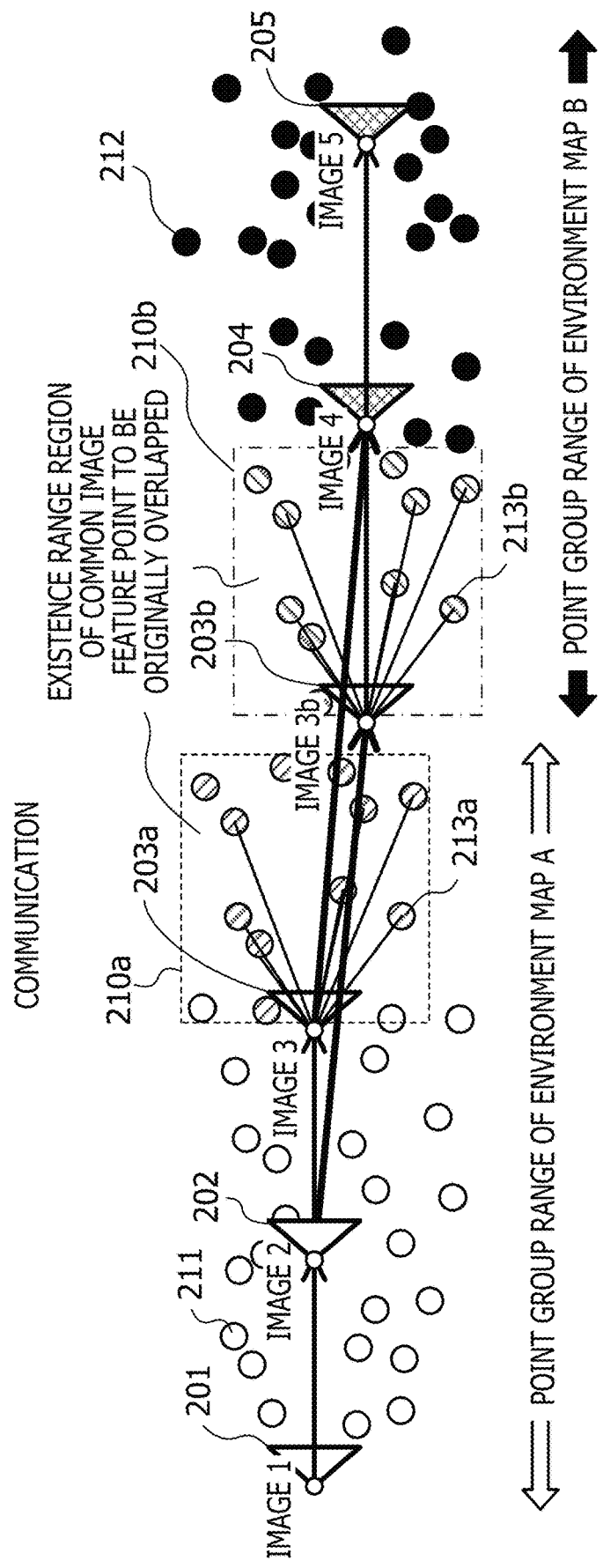
FIG. 2 is an explanatory diagram schematically illustrating an example of an overhead bird's-eye view of an actual environment map (with a position error)

FIG. 1 is an explanatory diagram schematically illustrating an example of an overhead bird's-eye view of an ideal environment map (without a position error), and FIG. 2 is an explanatory diagram schematically illustrating an example of an overhead bird's-eye view of an actual environment map (with a position error). In FIG. 1, a case is illustrated where there is a traveling road from the left side toward the right side, in other words, in the direction of camera 101→camera 102→ . . . →camera 105. Then, images 1 to 5 correspond to the cameras 101 to 105, respectively. In addition, in each of the cameras 101 to 105 indicated by triangular figures, a white circle at a vertex indicates a camera origin, in other words, an imaging position.

In FIG. 1, as two environment maps A and B, the three-dimensional positions of a circle (white circle "○") including respective image feature points 111 extracted from images while traveling on a traveling road and a circle (black circle "●") including the image feature points 112 are displayed in different colors. A circle indicated by a white circle "○" is an image feature point in the environment map A, and a circle indicated by a black circle "●" is an image feature point in the environment map B. Then, a circle (circle with a diagonal line) including an image feature point 113 that is neither a white circle "○" nor a black circle "●" indicates an image feature point in an existence range region 110 of an image feature point common to the environment map A and the environment map B. In addition, in FIG. 1, a state where the imaging positions and orientations of the images 1 to 5 are estimated using the environment map is also illustrated.

As illustrated in FIG. 1, in an ideal environment map, since there is no position error, in other words, there is no error in the GNSS information, "positional deviation" does not occur between the environment map A and the environment map B. Therefore, since the three-dimensional positions of the common image feature points over the traveling road, for example, the corners of the same building, are the same three-dimensional positions in both the environment map A and the environment map B, the image feature points of the overlapping portion 110 of the environment maps are all the same three-dimensional positions.

Therefore, the positions and orientations of the images 1 to 5 obtained by estimating the imaging position and orientation by comparing the 3D positions of the peripheral image feature point group back-projected onto the image by normal perspective projection with the appearance state of the image feature points on the actual image have no positional deviation of the image feature points between the environment map A and the environment map B. Even in a case where any map is used, the position and orientation of the image 3 estimated at the feature points in the overlapping section are specified as the same one value, and no gap occurs in a case where the environment maps are switched.

On the other hand, FIG. 2 illustrates a state of the environment map A and the environment map B in which the positional deviations occur due to the GNSS position error. Similarly to FIG. 1, in FIG. 2, a case is illustrated where there is a traveling road from the left side toward the right side, in other words, in the direction of camera 201→camera 202→ . . . →camera 205. Then, images 1 to 5 correspond to the cameras 201 to 205, respectively.

In FIG. 2, the three-dimensional positions of a circle (white circle "○") including an image feature point 211 and a circle (black circle "●") including an image feature point 212 extracted from the video during traveling around the traveling road are displayed in different colors for the environment maps A and B. A circle indicated by a white circle "○" is an image feature point in the environment map A, and a circle indicated by a black circle "●" is an image feature point in the environment map B. Then, a circle (circle with a diagonal line upwards to the right) including an image feature point 213a that is neither a white circle "○" nor a black circle "●" indicates an image feature point in an existence range region 210a of an image feature point common to the environment maps A and B. In addition, a circle including an image feature point 213b (circle with a diagonal line upwards to the left) indicates an image feature point in an existence range region 210b of the common image feature point. The existence range regions 210a and 210b of the common image feature point correspond to the existence region 110 of the common image feature point in FIG. 1, and are the existence range regions of the common image feature point to be originally overlapped.

As illustrated in FIG. 2, since there is a position error in the actual environment map, in other words, there is an error in the GNSS information or the like, "positional deviation" occurs between the environment map A and the environment map B, and the common image feature point groups in the overlapping section do not have the same 3D position and exist in different locations. Therefore, in the imaging position and orientation of the "image 3" estimated from the positional relationship with the same image feature point, there is a difference between the position and orientation ("image 3a") estimated from the environment map A and the position and orientation ("image 3b") estimated from the environment map B. Therefore, when shifting from the environment map A to the environment map B, whichever position is used as the "image 3", a positional difference larger than the original positional difference is generated between the position and orientation of the "image 2" or the "image 4" of the preceding and subsequent positions, and a gap is generated in the estimated position and orientation. An object of the present disclosure is to solve the problem of the deviation of the environment map due to the error of the GNSS information.

Figure 3:
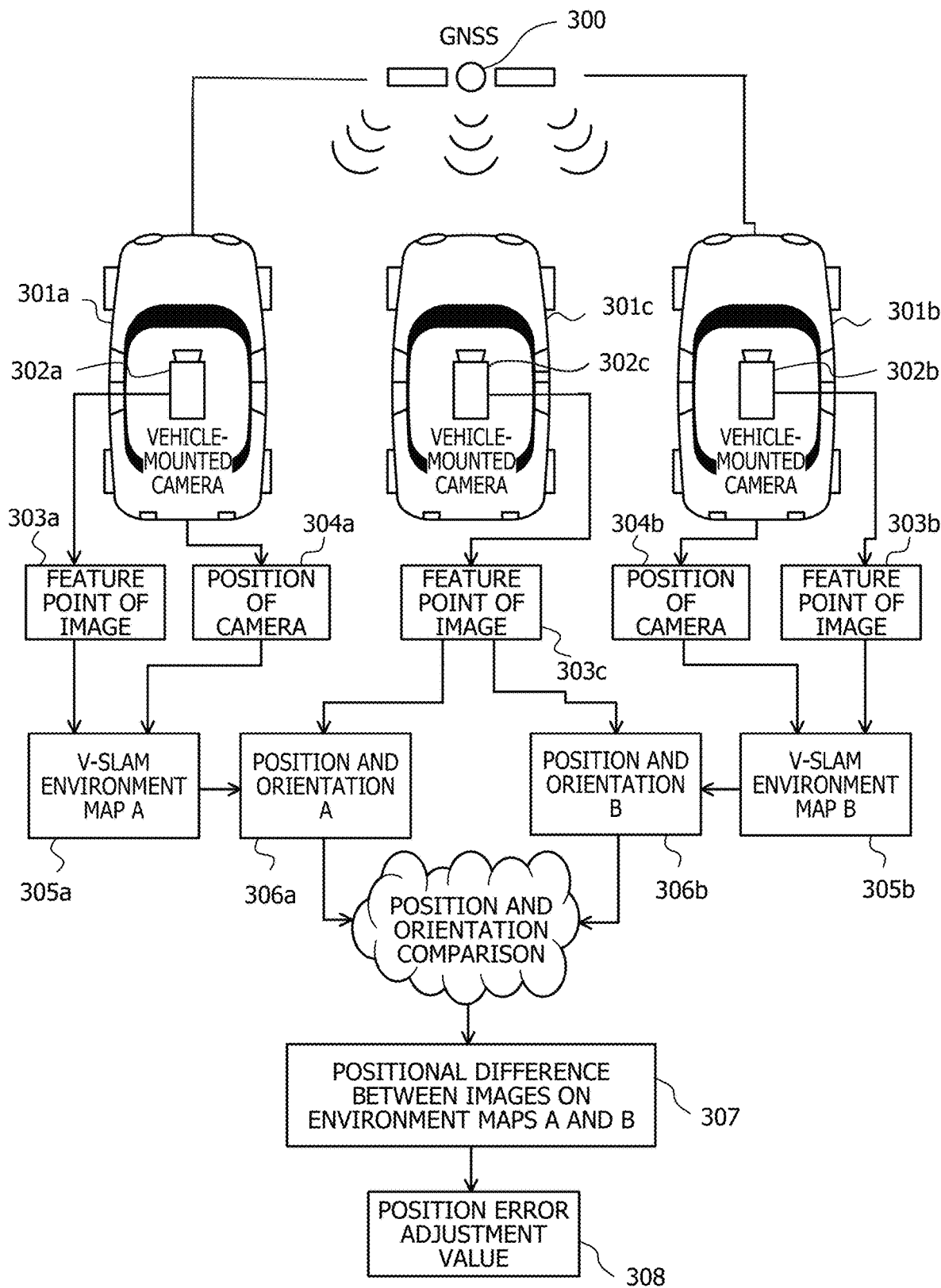
FIG. 3 is an explanatory diagram illustrating an example of an outline of an environment map adjustment value calculation method and an environment map adjustment value calculation program.

FIG. 3 is an explanatory diagram illustrating an example of an outline of an environment map adjustment value calculation method and an environment map adjustment value calculation program. In FIG. 3, a vehicle-mounted camera 302a is mounted on a regular vehicle 301a. An environment map A 305a of the V-SLAM is created based on a feature point 303a of an image in a video captured by the vehicle-mounted camera 302a and positioning information by a (GNSS) satellite 300, in other words, a position of the vehicle-mounted camera (in other words, the position of regular vehicle) 304a by radio waves from the satellite 300.

Similarly, a vehicle-mounted camera 302b is mounted on a regular vehicle 301b. An environment map B 305b of the V-SLAM is created from a feature point 303b of an image in a video captured by the vehicle-mounted camera 302b and a camera position 304b which is positioning information by the GNSS satellite 300.

Furthermore, a vehicle-mounted camera 302c is mounted on a regular vehicle 301c, and a feature point 303c of an image in a video captured by the vehicle-mounted camera 302c is created.

Then, the position and orientation A 306a estimated based on the environment map A 305a and the position and orientation B 306b estimated based on the environment map B 305b are calculated for the feature point 303c of the image, and the positions of those two positions and orientations 306a and 306b to be the positions and orientations of the same images are compared to obtain a positional difference 307. Based on the positional difference 307, an adjustment value 308 for adjusting a position error (deviation) between the environment map A 305a and the environment map B 305b is calculated. One of the environment map A 305a and the environment map B 305b is corrected using the calculated adjustment value 308.

Note that, as described later, the regular vehicle 301c and the vehicle-mounted camera 302c may be the same as the regular vehicle 301a and the vehicle-mounted camera 302a. Alternatively, the regular vehicle 301c and the vehicle-mounted camera 302c may be the same as the regular vehicle 301b and the vehicle-mounted camera 301b. Therefore, the feature point 303c of the image may be equal to either the feature point 303a of the image or the feature point 303b of the image.

Hereinafter, detailed contents of the environment map adjustment value calculation method and the environment map adjustment value calculation program will be described in First Embodiment (Embodiment 1) and Second Embodiment (Embodiment 2).

First Embodiment

Figure 4:
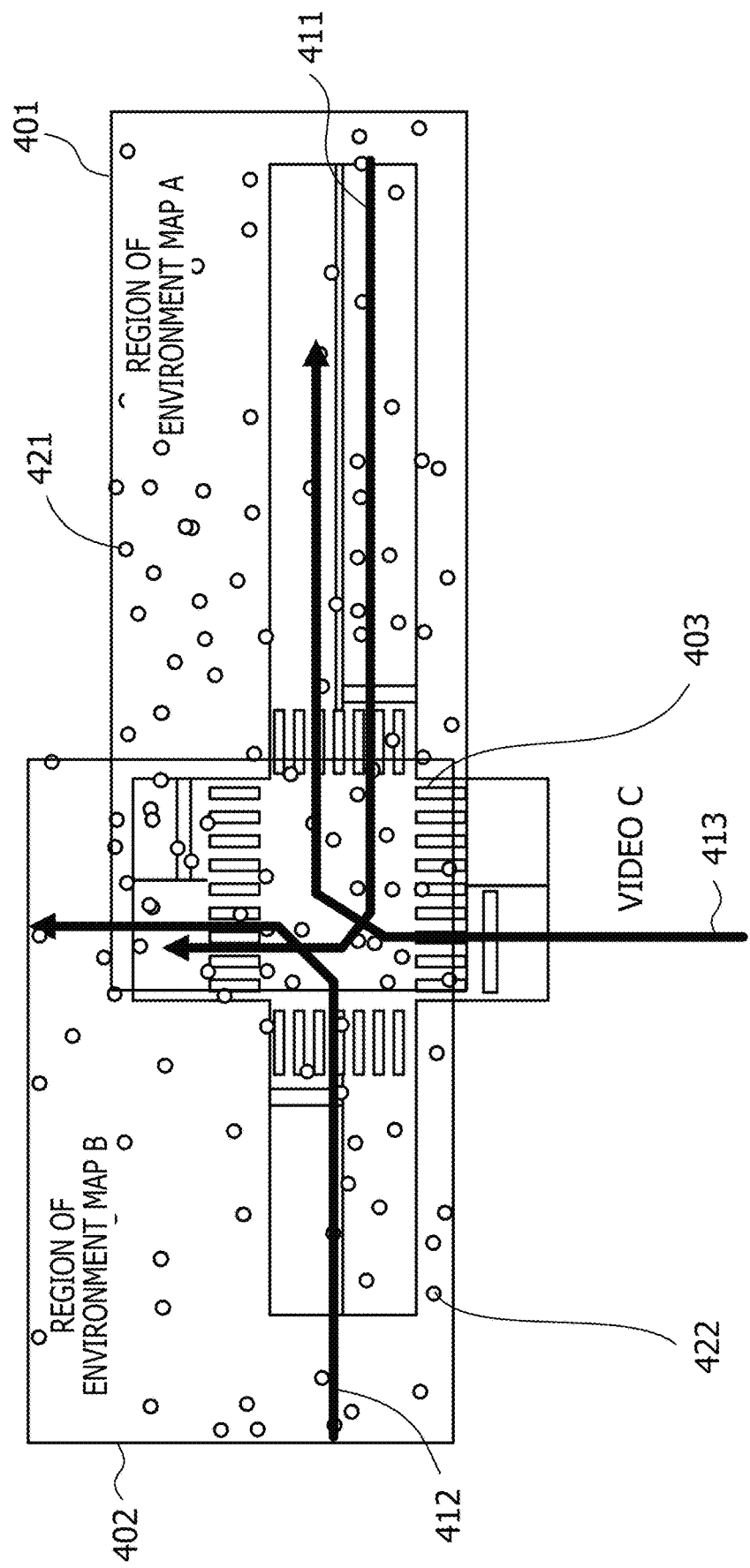
FIG. 4 is an explanatory diagram schematically illustrating an example of a relationship between an environment map and a video (First Embodiment)

FIG. 4 is an explanatory diagram schematically illustrating an example of a relationship between an environment map and a video (First Embodiment). In FIG. 4, as an example of a video A, a video B, and a video C, a traveling route at the time of imaging each video, and an example of the environment map A and the environment map B created from the video A and the video B are schematically illustrated using an overhead bird's-eye view.

In FIG. 4, a region 401 of the environment map A indicates the existence range of the 3D position of the image feature point appearing in the video A, and a region 402 of the environment map B indicates the existence range of the 3D position of the image feature point appearing in the video B. The circle in the region 401 of the environment map A including a reference numeral 422 indicates the image feature point 3D position of the environment map A, and the circle in the region 402 of the environment map B including a reference numeral 421 indicates the image feature point 3D position of the environment map B.

An arrow 411 indicates a traveling route of the video A when the environment map A is created, and an arrow 412 indicates a traveling route of the video B when the environment map B is created. In addition, an arrow 413 indicates a traveling route of the video C. Here, the video C is a video including the same position as the environment map A and the environment map B including the same position. In FIG. 4, the video C is different from the video A and the video B, and as described later, the video C may be the same as either the video A or the video B. In addition, traveling directions of the videos A to C are indicated by arrows, and the traveling direction is not limited as long as the position and orientation estimation by the SLAM processing may be calculated (however, the position and orientation estimation by the SLAM processing is more easily calculated in the same traveling direction).

As illustrated in FIG. 4, in the environment map A and the environment map B, the image feature points of the same section (overlapping section 403) are included in the videos traveled the same position. In First Embodiment, the environment map adjustment value is calculated using the image feature points in the overlapping section 403.

System Configuration Example

Figure 5:
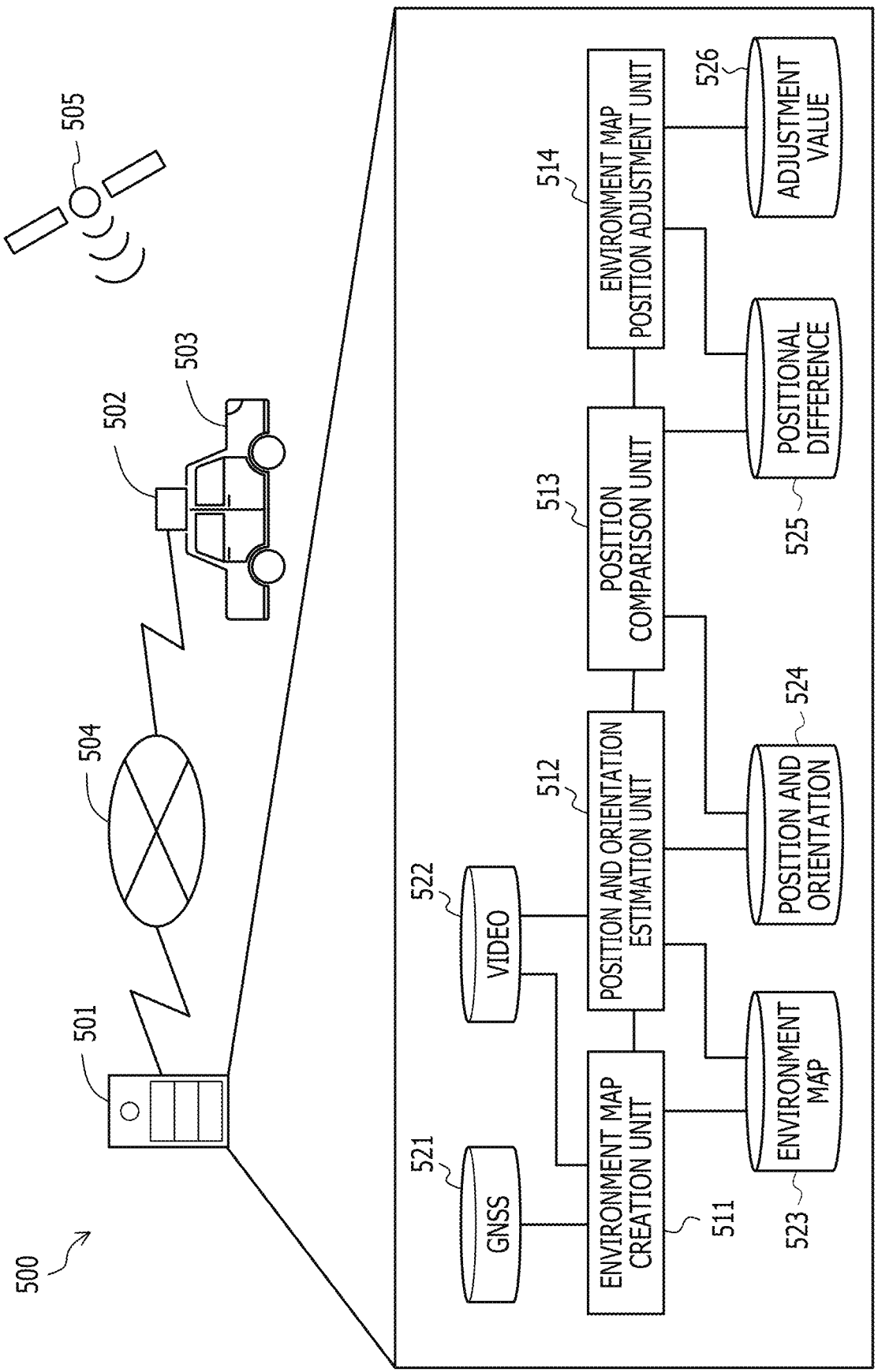
FIG. 5 is an explanatory diagram illustrating an example of a system configuration for realizing the environment map adjustment value calculation method.

FIG. 5 is an explanatory diagram illustrating an example of a system configuration for realizing the environment map adjustment value calculation method. In FIG. 5, a system 500 that realizes the environment map adjustment value calculation method according to the embodiment is provided with a server 501 and a vehicle-mounted device 502 mounted on a moving object 503. The vehicle-mounted device 502 is mounted on the moving object 503 and collects GNSS information from a satellite 505 and a video of a vehicle-mounted camera (imaging device 706 illustrated in FIG. 7 described later).

Then, the server 501 and the vehicle-mounted device 502 are coupled by a network 504 to form the system 500. In addition, although not illustrated, the system 500 may realize the function of a cloud computing system.

Specifically, for example, the moving object 503 is a commercial vehicle such as a regular passenger car or a taxi, a two-wheeled vehicle (motorcycle or bicycle), or a large vehicle (bus or truck). In addition, the moving object 503 may also be a connected car that collects information. In addition, the moving object 503 may be a ship moving on water, an aircraft moving in the sky, an unmanned aircraft (drone), an autonomous traveling robot, or the like.

The vehicle-mounted device 502 collects information on a captured video of a vehicle-mounted camera (imaging device 706 illustrated in FIG. 7 described later). In addition, the vehicle-mounted device 502 collects information on the moving object 503 including GNSS information which is an example of positioning information. Information on the moving object 503 also may include the orientation information on the moving object 503 collected from the moving object 503. In addition, the vehicle-mounted device 502 may also collect information on the imaging time and the like.

The vehicle-mounted device 502 may be a dedicated device mounted on the moving object 503 or may be a removable device. In addition, a mobile terminal device having a communication function such as a smartphone or a tablet may be used as the moving object 503. In addition, all or a portion of the various functions of the vehicle-mounted device 502 may be realized by using the functions provided in the moving object 503.

Therefore, the expression "vehicle-mounted" of the vehicle-mounted device 502 is not limited to the meaning of a dedicated device mounted on a moving object. The vehicle-mounted device 502 may be any type of device as long as the device has a function capable of collecting information in the moving object 503 and transmitting the collected information to the server 501.

The vehicle-mounted device 502 acquires information (vehicle-mounted data) on the moving object 503 including information on the captured video and GNSS information, and stores the acquired vehicle-mounted data. Then, the stored vehicle-mounted data is transmitted to the server 501 via the network 504 by wireless communication. In addition, various data including a program distributed from the server 501 is received by wireless communication via the network 504.

In addition, the vehicle-mounted device 502 may acquire information on another moving object 503 traveling nearby by a short distance communication function and may transmit the information to the server 501. In addition, the vehicle-mounted devices 502 may communicate with each other by the short distance communication function and may communicate with the server 501 via another vehicle-mounted device 502.

As described above, in a moving object position estimating system 500, the server 501 may acquire vehicle-mounted data from the vehicle-mounted device 502 mounted on the moving object 503 and may distribute various data to the vehicle-mounted devices 502.

In addition, the vehicle-mounted device 502 may not be provided with communication means. In other words, the vehicle-mounted device 502 may not be coupled to the server 501 via the network 504. In that case, the data accumulated in the vehicle-mounted device 502 may be input to the server 501 offline (for example, manually via recording media).

The server 501 includes an environment map creation unit 511, a position and orientation estimation unit 512, a position comparison unit 513, and an environment map position adjustment unit 514. These components 511 to 514 may constitute a control unit of the server 501. Furthermore, a target selection unit 1001 illustrated in FIG. 10 described later may be provided. In addition, the server 501 has GNSS-a, GNSS-b, and GNSS-c as the GNSS information acquired together with a video 522 (video A 522a, video B 522b, and video C 522c).

In addition, the server 501 holds environment map data ("environment map" 523) as internal processing data, position and orientation data ("position and orientation" 524) as intermediate data, positional difference data ("positional difference" 525) as offset data, and adjustment value data ("adjustment value" 526) for correcting the position of the environment map B 523b. In addition, the camera video ("video" 522) is acquired from the vehicle-mounted device 502, and the GNSS information ("GNSS" 521) acquired simultaneously with the video 522 is also acquired from the vehicle-mounted device 502.

The environment map creation unit 511 inputs a captured time-series image (video) 522 and creates an environment map 523 based on features of a given image in the input video 522. The environment map creation unit 511 may input the acquired GNSS 521 together with the video A 522a, the video B 522b, and the video C 522c.

The position and orientation estimation unit 512 estimates (calculates) the position and orientation 524 based on the information on the environment map 523 created by the environment map creation unit 511 and the video information 522. The position comparison unit 513 compares the positions of the same image among the positions and orientations 524 estimated (calculated) by the position and orientation estimation unit 512 and outputs a positional difference 525. The environment map position adjustment unit 514 calculates an adjustment value 526 for adjusting the difference between the environment maps based on the positional difference 525 output by the position comparison unit 513.

Figure 9:
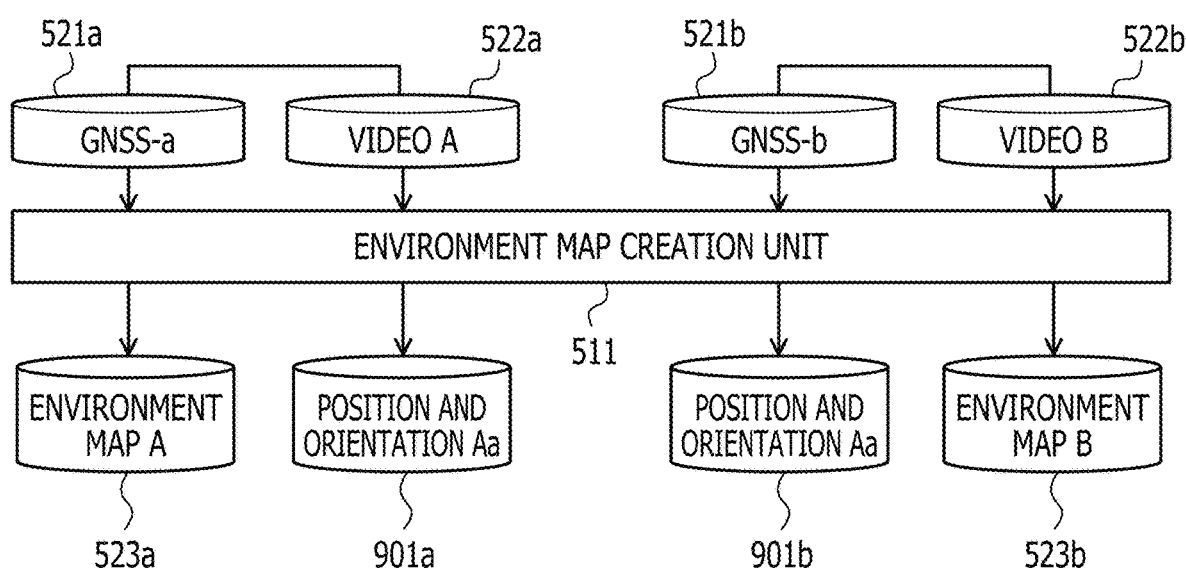
FIG. 9 is an explanatory diagram illustrating an example of the contents of an environment map creation unit.

More specifically, as illustrated in FIG. 9, the environment map creation unit 511 creates a first environment map (environment map A 523a) based on the feature of a given image among captured first time-series images (video A 522a). In addition, the environment map creation unit 511 creates a second environment map (environment map B 523b) based on the feature of a given image among second time-series images (video B 522b) captured separately from the environment map A 523a. The first time-series image and the second time-series image may be captured by the imaging device 706 (refer to FIG. 7) of the moving object 503 (of the vehicle-mounted device 502).

Figure 10:
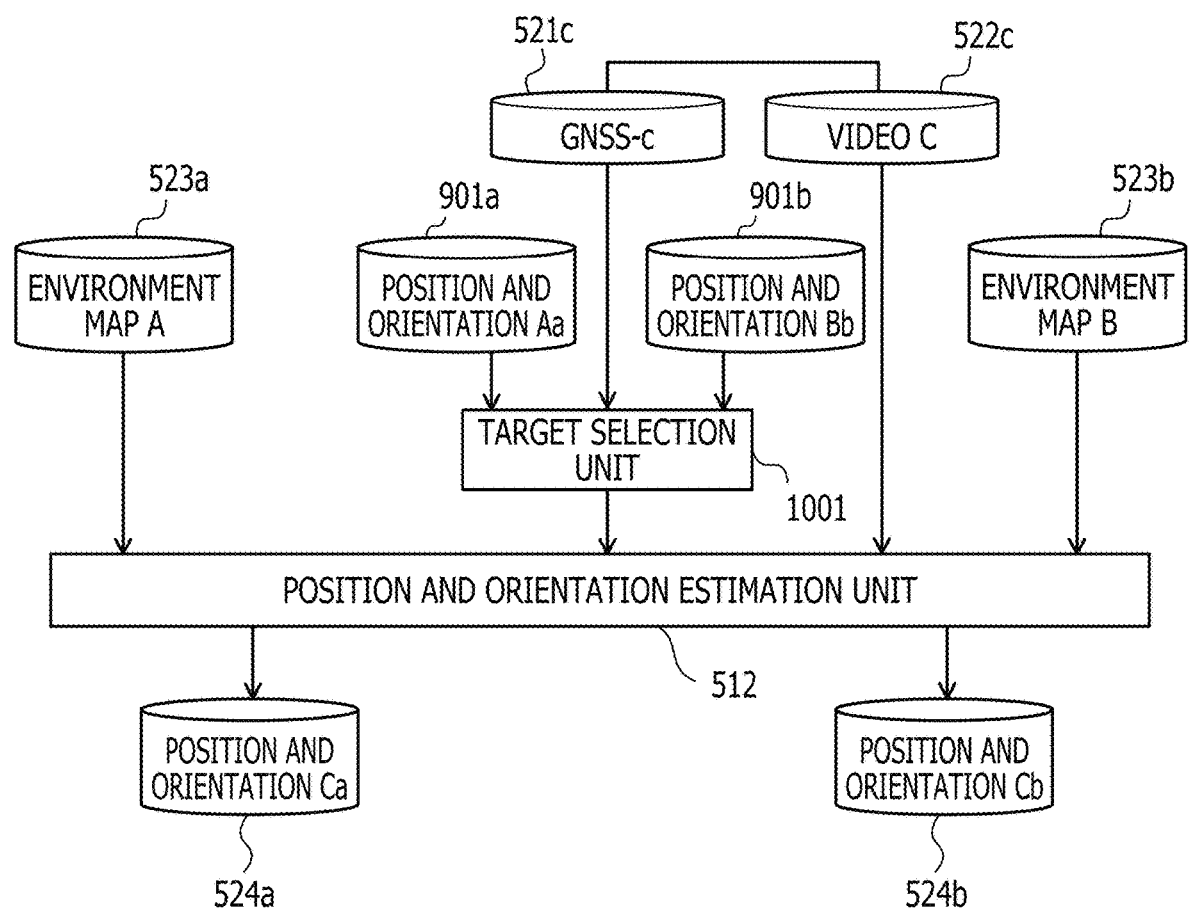
FIG. 10 is an explanatory diagram illustrating an example of the contents of a target selection unit and a position and orientation estimation unit.

In addition, as illustrated in FIG. 10, the position and orientation estimation unit 512 estimates (calculates) the position and orientation Ca 524a based on the information on the environment map A 523a. In addition, the position and orientation estimation unit 512 estimates (calculates) the position and orientation Cb 524b based on the information on the environment map B 523b. More specifically, the position and orientation estimation unit 512 estimates (calculates) the position and orientation Ca 524a of the video C 522c estimated based on the information on the environment map A 523a using a third time-series image (video C 522c) including the imaging location of the video A 522a and the imaging location of the video B 522b. In addition, the position and orientation estimation unit 512 estimates the position and orientation Cb 524b of the video C 522c estimated based on the information on the environment map B 523b using the video C 522c.

Figure 11:
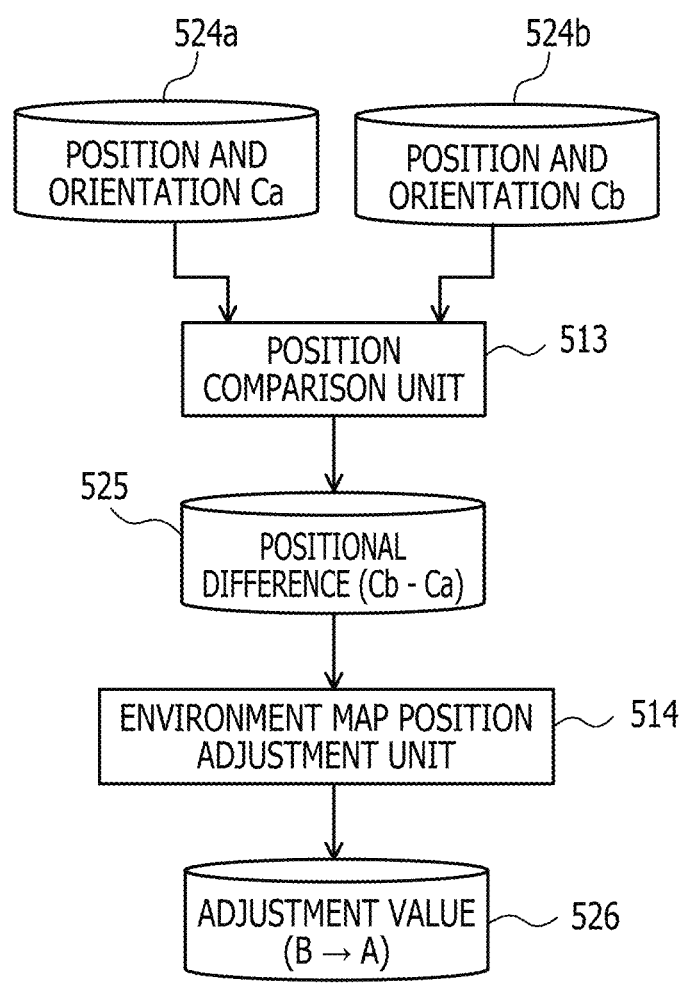
FIG. 11 is an explanatory diagram illustrating an example of the contents of a position comparison unit and an environment map position adjustment unit.

In addition, as illustrated in FIG. 11, the position comparison unit 513 compares the position of the image related to the position and orientation 524a estimated (calculated) by the position and orientation estimation unit 512 with the position of the image related to the position and orientation 524b estimated (calculated) by the position and orientation estimation unit 512 and outputs a positional difference 525 as a result of the comparison.

In addition, the environment map position adjustment unit 514 calculates an adjustment value 526 for adjusting the difference between the environment map A 523a and the environment map B 523b based on the positional difference 525 output by the position comparison unit 513. In addition, the environment map position adjustment unit 514 may store the information on the calculated adjustment value 526 in association with at least one of the environment map A 523a and the environment map B 523b.

Figure 12:
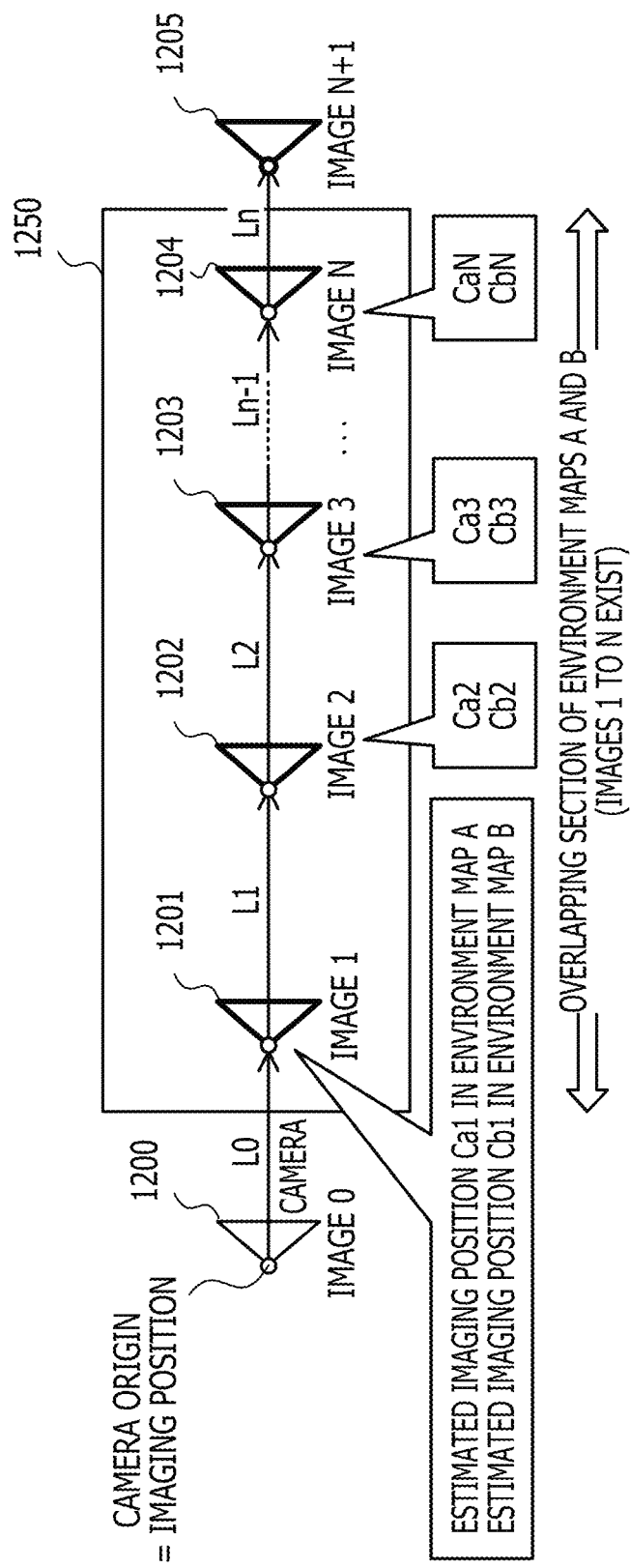
FIG. 12 is an explanatory diagram illustrating an example of the contents of adjustment value calculation.

In addition, as illustrated in FIG. 12, the environment map position adjustment unit 514 may calculate an adjustment value 526 using the positional difference 525 between the position of the image in the environment map A 523a and the position of the image in the environment map B 523b, and the positional difference between the images used to calculate the positional difference 525.

In addition, the environment map position adjustment unit 514 may use the positional difference 525 from the position of the image in the environment map A 523a to select a plurality of images having a positional difference 525 equal to or larger than a specified value, and obtain a spatial transformation matrix using the position of the selected image group to calculate the adjustment value 526.

Figure 13:
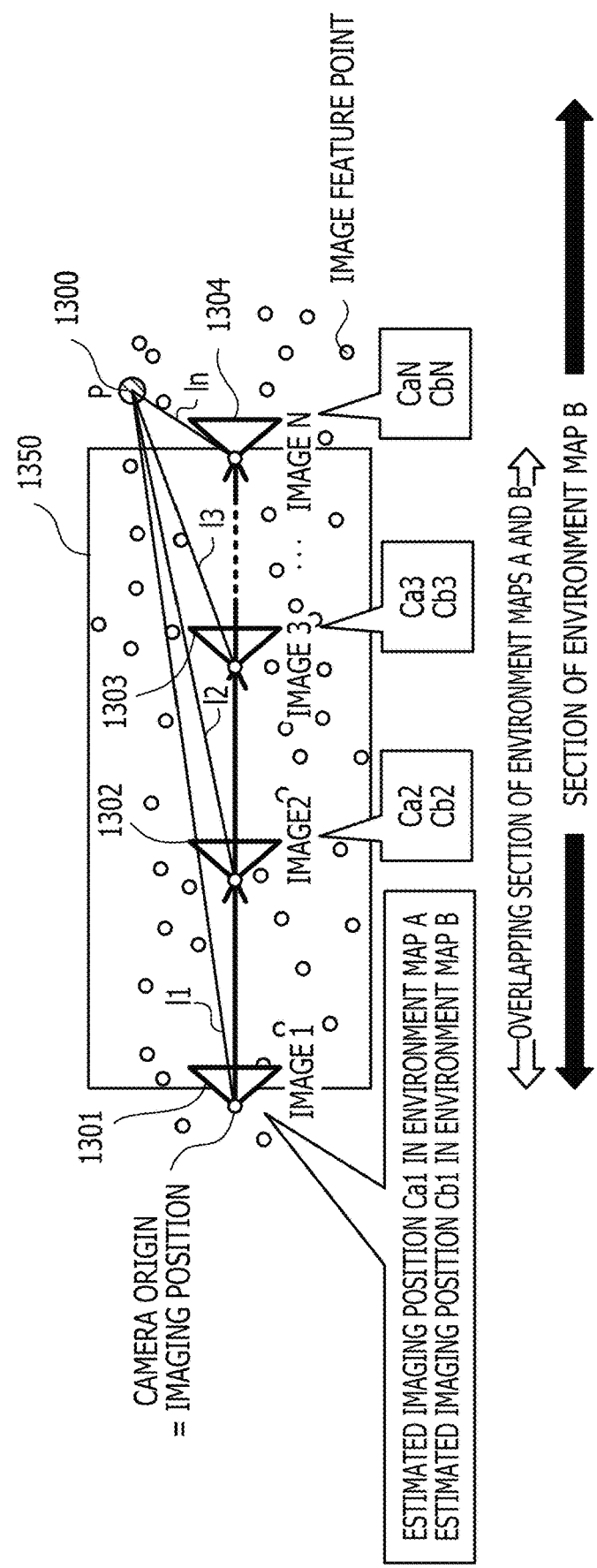
FIG. 13 is an explanatory diagram illustrating another example of the contents of adjustment value calculation.

In addition, as illustrated in FIG. 13, the environment map position adjustment unit 514 may calculate the adjustment value 526 using the positional difference 525 from the position of the image in the environment map A 523a, the position of the image used to calculate the positional difference 525, and a positional difference from the three-dimensional position of a given image feature included in the environment map 523.

In FIG. 5, the server 501 includes the environment map creation unit 511, the position and orientation estimation unit 512, the position comparison unit 513, and the environment map position adjustment unit 514. Although not illustrated, at least one of these functional units may be included in the vehicle-mounted device 502, in addition to the server 501, or instead of the server 501. In a case where the vehicle-mounted device 502 includes at least one of the functional units 511, 512, 513, and 514, the vehicle-mounted device 502 may have the same contents as the processing performed by the server 501. In addition, the server 501 may include a plurality of servers, and the plurality of servers may distribute each of the functional units to perform processing.

Hardware Configuration Example of Server

Figure 6:
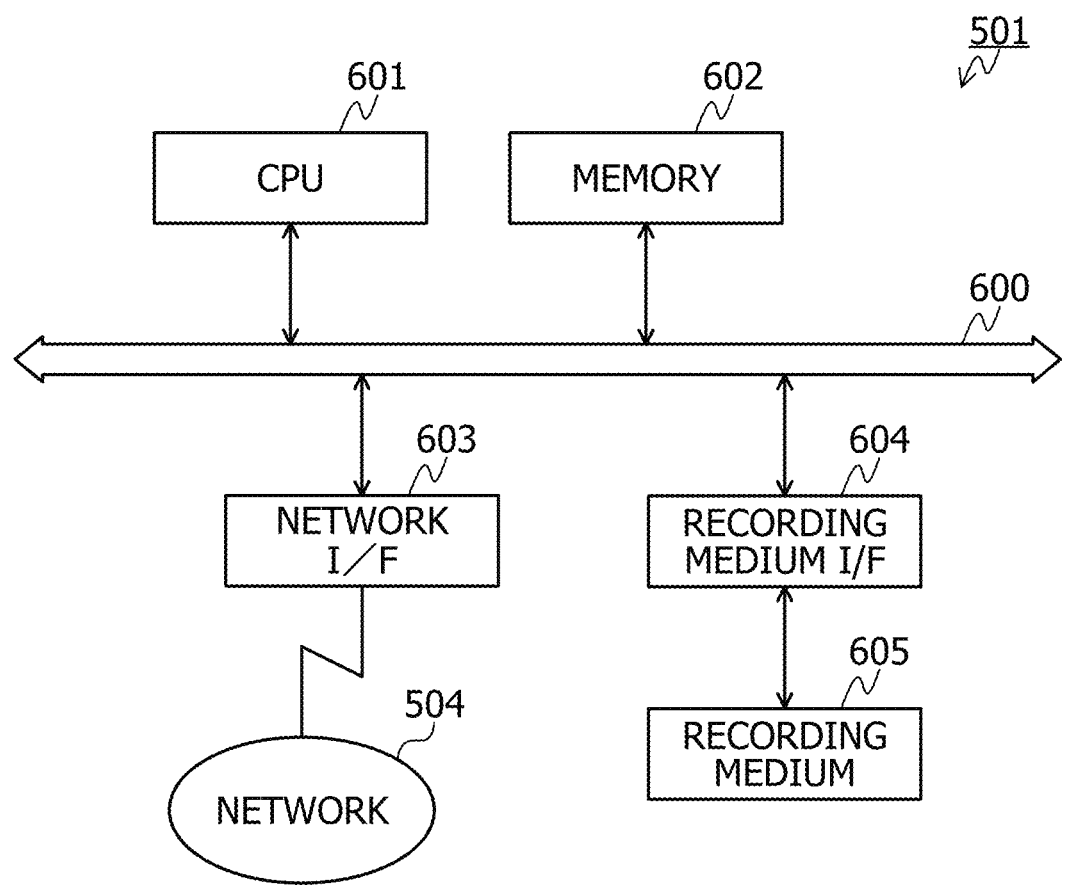
FIG. 6 is a block diagram illustrating an example of a hardware configuration of a server.

FIG. 6 is a block diagram illustrating an example of a hardware configuration of a server. The server 501, which is an example of an information processing apparatus, includes one or a plurality of central processing unit (CPU) 601, a memory 602, a network interface (I/F) 603, a recording medium I/F 604, and a recording medium 605. In addition, each of the components is coupled to one another through a bus 600. The CPU is also called as a processor.

Here, the CPU 601 administrates control of the entire server 501. The memory 602 includes, for example, a read-only memory (ROM), a random-access memory (RAM), a flash ROM, and the like. Specifically, for example, the flash ROM and the ROM store various programs, and the RAM is used as a work area of the CPU 601. A program stored on the memory 602 causes the CPU 601 to execute coded processing by being loaded into the CPU 601.

The network I/F 603 is coupled to the network 504 through a communication line and is coupled to other devices (for example, vehicle-mounted device 502 and other servers and systems) via the network 504. Then, the network I/F 603 administrates the interface between the network 504 and the interior of the own device and controls input and output of data from the other device. As the network I/F 603 may adopt, for example, a modem, a LAN adapter, or the like.

The recording medium I/F 604 controls read/write of data for the recording medium 605 under the control of the CPU 601. The recording medium 605 stores the data written under the control of the recording medium I/F 604. Examples of the recording medium 605 include a magnetic disc and an optical disc.

Note that, the server 501 may include, for example, a solid-state drive (SSD), a keyboard, a pointing device, a display, and the like, in addition to the above-described components.

Hardware Configuration Example of Vehicle-Mounted Device

Figure 7:
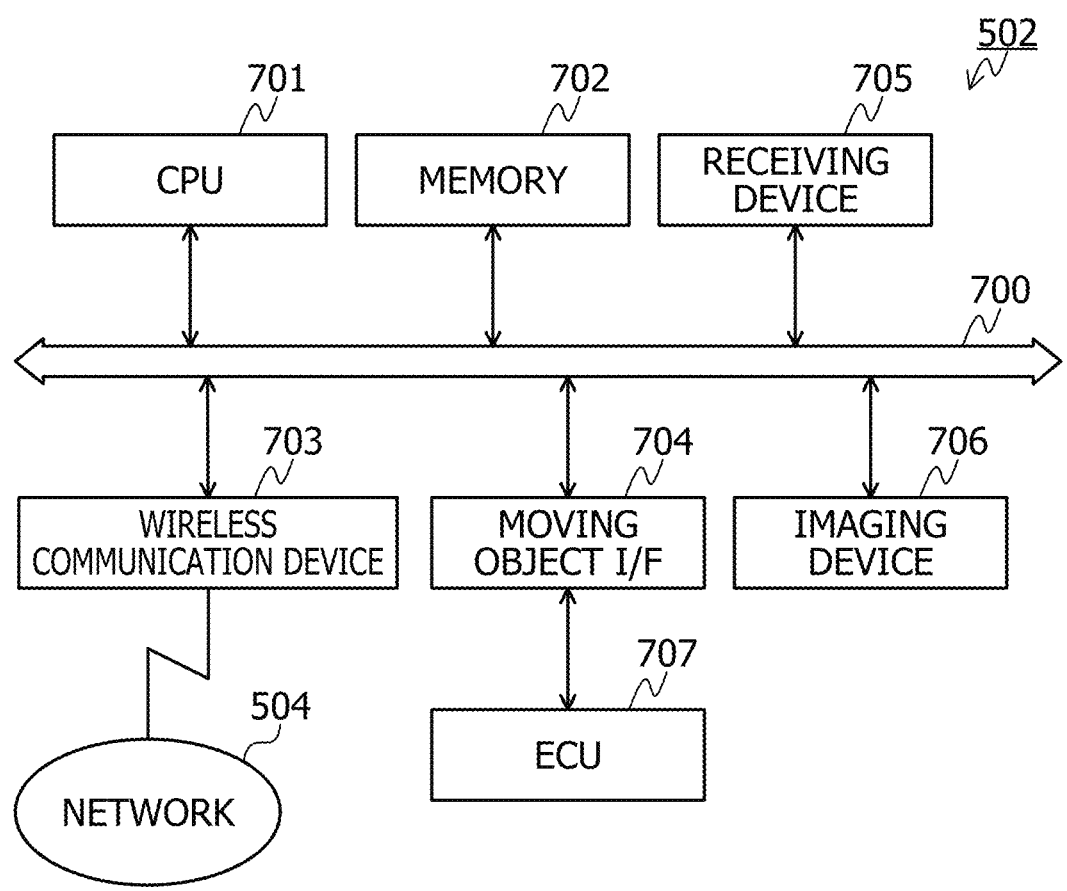
FIG. 7 is a block diagram illustrating an example of a hardware configuration of a vehicle-mounted device.

FIG. 7 is a block diagram illustrating an example of a hardware configuration of a vehicle-mounted device. The vehicle-mounted device 502, which is an example of an information collection device, includes a CPU 701, a memory 702, a wireless communication device 703, a moving object I/F 704, a receiving device 705, and an imaging device 706. In addition, each of the components is coupled to one another through a bus 700.

The CPU 701 administrates control of the entire vehicle-mounted device 502. The memory 702 includes, for example, a ROM, a RAM, and a flash ROM. Specifically, for example, the flash ROM and the ROM store various programs, and the RAM is used as a work area of the CPU 701. A program stored on the memory 702 causes the CPU 701 to execute coded processing by being loaded into the CPU 701.

The wireless communication device 703 receives the transmitted radio waves or transmits the radio waves. The wireless communication device 703 has a configuration including an antenna and a receiving device and is provided with a function of transmitting and receiving communication such as mobile communication (specifically, for example, 3G, 4G, 5G, PHS communication) according to various communication standards, and Wi-Fi (registered trademark).

The moving object I/F 704 administrates the interface between the moving object 503 and the interior of the own device of the vehicle-mounted device 502 and controls data input and output from the moving object 503. Therefore, the vehicle-mounted device 502 collects information from an electronic control unit (ECU) (including various sensors and the like) 707 included in the moving object 503 via the moving object I/F 704. Specifically, for example, the moving object I/F 704 may be a coupler when coupled by wire or a short-range wireless communication (specifically, for example, Bluetooth (registered trademark)) device.

The receiving device (for example, GNSS receiving device such as a global positioning system (GPS) receiving device) 705 receives radio waves from a plurality of satellites 505 and calculates the current position on the earth from the information included in the received radio waves.

The imaging device (such as a camera) 706 is a device that images a still image and a moving image. Specifically, for example, the imaging device 706 includes a lens and an imaging sensor (for example, image sensor). The imaging device 706 may be a drive recorder. An image captured by the imaging device 706 is stored on the memory 702. In addition, the imaging device 706, such as a camera, may include an image recognition function, a function of reading a bar code or a QR code (registered trademark), an optical mark reader (OMR) function, an optical character reader (OCR) function, and the like.

As illustrated in FIG. 7, the GNSS receiving device 705 and the imaging device 706 may be included in the vehicle-mounted device 502, or may be included in the moving object 503 or separately and externally attached and used. At this time, the data exchange between the GNSS receiving device 705 or the imaging device 706 and the vehicle-mounted device 502 may be performed by wired or wireless communication.

In a case where the GNSS receiving device 705 or the imaging device 706 is not provided in the vehicle-mounted device 502, such information may be acquired via the moving object I/F 704 or the like. In addition, although not illustrated, the vehicle-mounted device 502 may include various input devices, a display, an interface for reading and writing recording medium such as a memory card, various input terminals, and the like.

Contents of Environment Map

Figure 8:
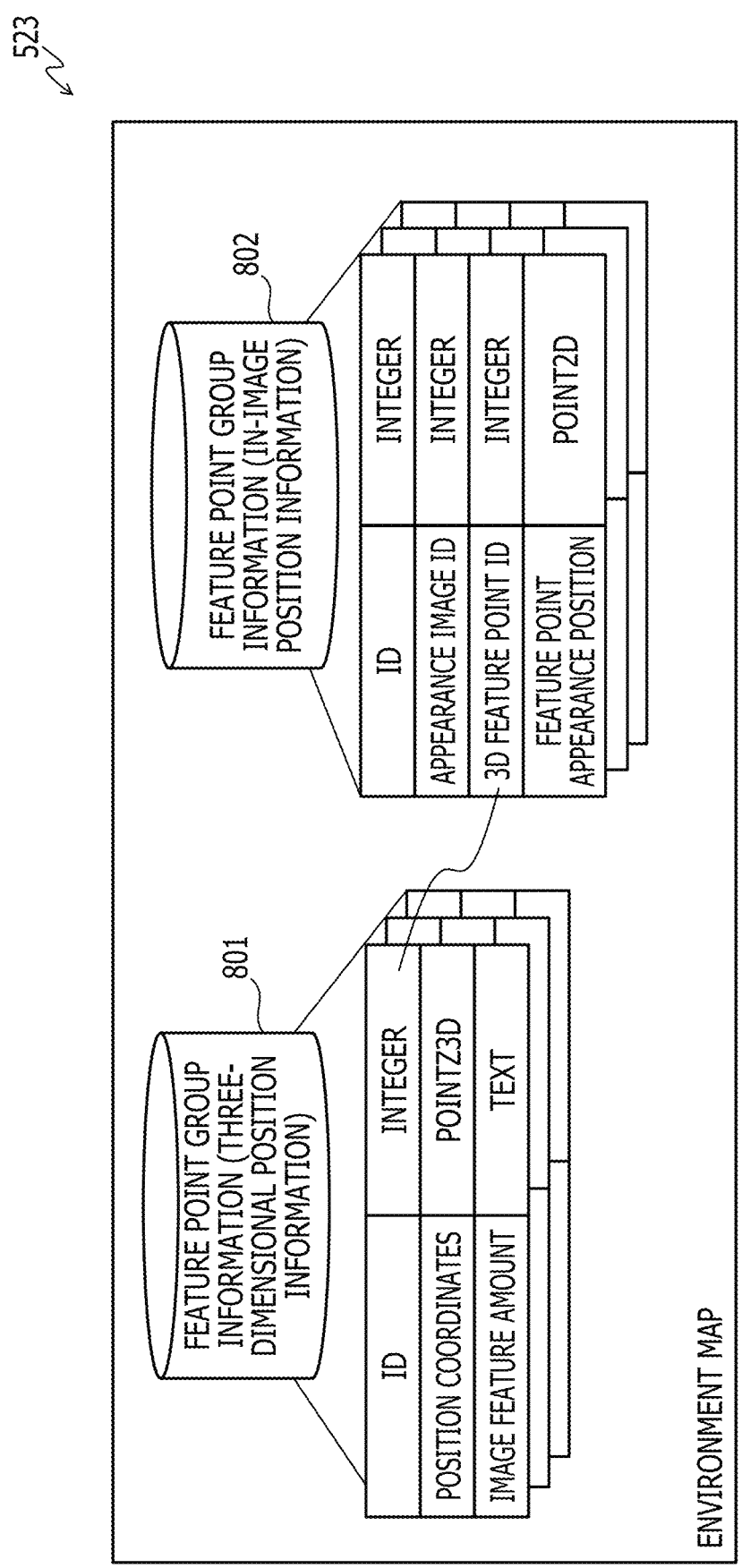
FIG. 8 is an explanatory diagram illustrating an example of a data configuration of the environment map.

FIG. 8 is an explanatory diagram illustrating an example of a data configuration of the environment map. In FIG. 8, the environment map 523 includes feature point group information (three-dimensional position information) 801. As illustrated in FIG. 8, the feature point group information (three-dimensional position information) 801 includes various types of information including "ID" which is unique identification information for identifying the feature point group information, "position coordinates" which is information (three-dimensional position information) on position coordinates of the feature point in the real coordinate system, and "image feature amount" which is information indicating the image feature amount. As described above, the environment map 523 has a data configuration having the image feature amount of the image feature point and the information on the three-dimensional position.

In addition, the environment map 523 may further include feature point group information (in-image position information) 802 in addition to the feature point group information (three-dimensional position information) 801. In order to estimate the imaging position and orientation of a given image using the environment map 523, it is required to know whether or not the image feature point of the environment map 523 appears on the given image, and where the image feature point is when the image feature point appears.

Therefore, by holding the feature point group information (in-image position information) 802, when estimating the imaging position and orientation of a given image using the environment map 523, it is possible to check whether or not an image similar to the given image is included in the image group at the time of creating the environment map 523, and determine in advance which image feature point appears in the created image using the feature point group information (in-image position information) 802.

As a result, it is possible to easily omit the use of the three-dimensional feature point group apparently irrelevant to the given image. As described above, in order to simplify the use of the environment map 523, the feature point group information (in-image position information) 802, which is appearance information on the feature point in each image used for creating the environment map 523, may be held as a reference.

The feature point group information (in-image position information) 802 includes various types of information including "ID" which is unique identification information for identifying the feature point group information, "appearance image ID" which is unique identification information for identifying an appearance image, "3D feature point ID" which is unique identification information (in other words, "ID" of feature point group information (three-dimensional position information) 801) for identifying the feature point group information (three-dimensional position information), and "feature point appearance position" which is information indicating the two-dimensional position of the feature point in the image.

As described above, the environment maps (environment map A 523a and environment map B 523b) include the position information on the image feature in the space (feature point group information (three-dimensional position information) 801). The position information may be information (position coordinates) on the position in the real coordinate system of an image feature (image feature amount) associated with one point in the space. In other words, the environment map 523 may be a V-SLAM map.

Contents of Environment Map Creation Unit 511

FIG. 9 is an explanatory diagram illustrating an example of the contents of the environment map creation unit. In FIG. 9, the environment map creation unit 511 is a processing unit that performs processing of inputting videos 522 (522a and 522b) for which environment maps are not created and GNSS information 521 (521a and 521b) acquired simultaneously with the videos 522, creating a three-dimensional position of an image feature in the video in a real coordinate system as the environment maps (523a and 523b), and outputting the three-dimensional position.

The GNSS-a 521a is GNSS information acquired by a positioning sensor (for example, receiving device 705 illustrated in FIG. 7) at the same time as the video A 522a. Similarly, the GNSS-b 521b is GNSS information acquired by the positioning sensor at the same time as the video B 522b. The GNSS-a 521a and the GNSS-b 521b are values including different position errors. Specifically, for example, the GNSS-a 521a and the GNSS-b 521b may be GPS values. It is desirable to convert each position into a value in a plane rectangular coordinate system or the like in order to simplify the calculation. Therefore, hereinafter, each position will be described as values obtained by converting the values of longitude and latitude, which are the real coordinate positions including the GNSS values, into two-dimensional values of orthogonal XY.

Note that, the relative positional difference between the installation positions of the acquired positioning sensor and the vehicle-mounted camera in the moving object is added to each position acquired by the positioning sensor, so that the position may be converted into the position of the vehicle-mounted camera. By using the position converted in this manner, it is possible to further improve the estimation accuracy of the imaging position and orientation of the video described below.

The video A 522a, the video B 522b, and a video C 522c described later are, for example, moving object videos captured at different timings. The moving object and the camera used for imaging may be different from each other, and the imaging dates and times may also be different from each other. In addition, the video A 522a, the video B 522b, and the video C 522c are videos traveled through the same position at the time of imaging.

Here, traveling at the same position does not mean traveling at exactly the same real coordinate position and may mean traveling in the same section of the traveling road. Specifically, for example, traveling at the same position includes passing through the same intersection or passing through in front of the same shop. Therefore, when traveling at the same position, there may be a slight difference in the traveling position or traveling in different lanes. In addition, the traveling directions may not be the same as each other. For example, the traveling at the same position may be traveling in the opposite direction, or may be traveling straight ahead passing the same intersection and traveling right or traveling left.

Then, the environment map creation unit 511 creates the environment map A 523a by using the video A 522a and the GNSS-a 521a. In addition, the environment map B 523b is created by using the video B 522b and the GNSS-b 521b. Note that, at this time, in First Embodiment, the position and orientation Aa, which is the imaging position and orientation of the image of the video A 522a, is output at the same time as the environment map A 523a, and the output of the position and orientation Aa may be omitted. Similarly, in First Embodiment, the position and orientation Bb, which is the imaging position and orientation of the image of the video B 522b, is output at the same time as the environment map B 523b, and the output of the position and orientation Bb may be omitted.

The creation of the environment map by the environment map creation unit 511 may be performed by using the technique of V-SLAM in the related art (specifically, for example, Visual-SLAM described in Japanese Patent Application No. 2018-202252 by the inventor of the present application).

Specifically, for example, in the server 501 illustrated in FIG. 6, the environment map creation unit 511 may realize the function by the CPU 601 executing the program stored in the memory 602. In addition, specifically, for example, in the vehicle-mounted device 502 illustrated in FIG. 7, the function may be realized by the CPU 701 executing the program stored in the memory 702.

Contents of Target Selection Unit 1001 and Position and Orientation Estimation Unit 512

FIG. 10 is an explanatory diagram illustrating an example of the contents of the target selection unit and the position and orientation estimation unit. In FIG. 10, a target selection unit 1001 is a processing unit that selects a target for which the position and orientation is to be estimated by the position and orientation estimation unit 512 and a video used for estimating the position and orientation. Specifically, the target selection unit 1001 is a processing unit that performs processing of checking whether or not there are a plurality of environment maps that are traveling at the same traveling position and for which the position error is not adjusted in the created environment map 523, and selecting one video 522 that is traveling at the traveling position.

In FIG. 10, the target selection unit 1001 compares the position and orientation information Aa 901a and the position and orientation Bb 901b output from the environment map creation unit 511. Then, it is determined whether or not the imaging position is within a specified distance, and it is determined whether or not the position and orientation information Aa 901a and the position and orientation Bb 901b are obtained by traveling at the same traveling position based on the determination result. Specifically, whether or not the imaging position is within the specified distance may be determined based on whether or not the distance between each position of the position and orientation Aa 901a and each position of the position and orientation Bb 901b is within a given system setting value, for example, 3 m.

As described above, instead of directly determining the distance between the position and orientation Aa 901a and the position and orientation Bb 901b, given two-dimensional or three-dimensional shapes such as a circle, a rectangle, an oval sphere, or a rectangular parallelepiped specified in advance may be set around the position and orientation Aa 901a or the position and orientation Bb 901b, and it may be determined whether one shape is included in the other shape or whether shapes overlap each other.

Note that, in the environment map creation unit 511, in a case where the output of the position and orientation Aa 901a and the position and orientation Bb 901b is omitted, it may be determined whether or not the imaging position is within the specified distance by substituting each of the positions of the GNSS-a 521a and the GNSS-b 521b used when the environment map A 523a and the environment map B 523b are created as the imaging position.

In addition, by comparing the 3D position coordinates of the image feature point groups included in the environment map A 523a and the environment map B 523b, and determining that the same image feature points are present a specified number or more, it may be determined that the environment map A 523a and the environment map B 523b include traveling videos at the same traveling position, in other words, environment maps requiring an overlapping section. In this case, in order to determine whether or not the image feature points are the same as each other, the point groups of the environment map A 523a and the environment map B 523b may be associated with each other using a known point group association method. Alternatively, the 3D position point groups of the image feature point groups included in the environment map A 523a and the environment map B 523b may be compared with each other as a group, and it may be determined that the environment map A 523a and the environment map B 523b are environment maps requiring an overlapping section when it is determined that the two group spaces overlap each other by a specified ratio or more.

Specifically, for example, in the server 501 illustrated in FIG. 6, the target selection unit 1001 may realize the function by the CPU 601 executing the program stored in the memory 602. In addition, specifically, for example, in the vehicle-mounted device 502 illustrated in FIG. 7, the function may be realized by the CPU 701 executing the program stored in the memory 702.

The position and orientation estimation unit 512 is a processing unit that estimates (calculates) the imaging position and orientation of each image of the video C 522c using the environment map A 523a and the environment map B 523b selected by the target selection unit 1001 and the video C 522c and outputs the position and orientation Ca 524a and the position and orientation Cb 524b, respectively.

For example, this processing is the imaging position and orientation estimation of the video C 522c using the environment map A 523a or the environment map B 523b in the real coordinate system as input by the V-SLAM using the related art, and the position and orientation Ca 524a is calculated in a case where the environment map A 523a is used as the position and orientation in the real coordinate system, and the position and orientation Cb 524b is calculated in a case where the environment map B 523b is used. Although the video portion that may be calculated as the position and orientation is limited to substantially the same section as the environment map, since the environment map A 523a and the environment map B 523b include a section (overlapping section) traveled the same position, it is possible to estimate the imaging position and orientation of the video C 522c traveled the overlapping section using either the environment map A 523a or the environment map B 523b.

As described above, the environment map A 523a and the environment map B 523b are found as the environment maps that include the traveling video of the same traveling position, in other words, that require the overlapping section, and the video C 522c is selected as the video that travels in the overlapping section. Note that, although the video C 522c is a video different from the video A 522a and the video B 522b, the video C 522c may be either the video A 522a or the video B 522b.

When the video C 522c is the video different from the video A 522a and the video B 522b, the video A 522a and the video B 522b are not used after the processing of the environment map creation unit 511. Therefore, after the environment map A 523a and the environment map B 523b are created, it is not required to continue to hold the videos (video A 522a and video B 522b) used for the creation, and the amount of retained data may be reduced accordingly. On the other hand, when the video C 522c is the same video as either the video A 522a or the video B 522b, it is possible to rapidly perform the subsequent processing after the environment map is created without waiting for the appearance of a new video C traveling in the relevant section.

In addition, in a case where the video C 522c is equal to the video A 522a, the position and orientation Ca 524a by the environment map A 523a for the video C 522c (actually, video A 522a) calculated by the position and orientation estimation unit 512 is substantially equal to the position and orientation Aa 901a output by the environment map creation unit 511. Therefore, the processing of the position and orientation estimation unit 512 may be omitted and the position and orientation Aa may be used instead of the position and orientation Ca. Similarly, in a case where the video C 522c is equal to the video B 522b, the processing of the position and orientation estimation unit 512 using the environment map B 523b and the video C 522c (actually, video B 522b) may be omitted, and the position and orientation Bb 901b output by the environment map creation unit 511 may be used instead of the position and orientation Cb 524b.

Specifically, for example, the position and orientation estimation unit 512 may realize the function by the CPU 601 executing a program stored in the memory 602 in the server 501 illustrated in FIG. 6. In addition, specifically, for example, in the vehicle-mounted device 502 illustrated in FIG. 7, the function may be realized by the CPU 701 executing the program stored in the memory 702.

Contents of Position Comparison Unit 513 and Environment Map Position Adjustment Unit 514

FIG. 11 is an explanatory diagram illustrating an example of the contents of the position comparison unit and the environment map position adjustment unit. In FIG. 11, the position comparison unit 513 is a processing unit that compares the position and orientation Ca 524a and the position and orientation Cb 524b of the video C 522c estimated by the position and orientation estimation unit 512.

The position comparison unit 513 searches for an estimated position and orientation of the same image included in both the position and orientation Ca 524a and the position and orientation Cb 524b, and calculates a positional difference (Cb−Ca) 525 of the same image. At least for the image group of the overlapping section, it is possible to calculate the difference between the estimated positions of the same image by each of the environment maps. The estimated position may be regarded as a two-dimensional value XY corresponding to latitude and longitude or a three-dimensional value obtained by further adding a height, and the positional difference 525 may be calculated as a two-dimensional value or a three-dimensional value. In addition, the norm of all the components of the two-dimensional value or the three-dimensional value may be calculated as a one-dimensional (one) value.

As described above, it is possible to set a value of a given dimension according to a calculation method of an adjustment value calculated by the environment map position adjustment unit 514 described later. Furthermore, the position comparison unit 513 may calculate not only the positional difference 525 but also the orientation difference. The calculated orientation difference may be used by the environment map position adjustment unit 514.

Specifically, for example, the position comparison unit 513 may realize the function by the CPU 601 executing a program stored in the memory 602 in the server 501 illustrated in FIG. 6. In addition, specifically, for example, in the vehicle-mounted device 502 illustrated in FIG. 7, the function may be realized by the CPU 701 executing the program stored in the memory 702.

In addition, in FIG. 11, the environment map position adjustment unit 514 is a processing unit that calculates an adjustment value 526 for correcting positional deviation between environment maps 523. The environment map position adjustment unit 514 calculates the adjustment value (B→A) 526 using the estimated positional difference 525 of the same image by the different environment maps 523 calculated by the position comparison unit 513. "B→A" indicates an adjustment value for correcting the positional deviation between the environment map B 523b and the environment map A 523a and adjusting the environment map B 523b to the position of the environment map A 523a. Note that, if required, an environment map may be output as an output of the present processing, and "environment map B'" obtained by actually correcting the environment map B 523a using the adjustment value 526 may be output instead of the adjustment value 526.

Specifically, for example, in a case where the positional difference is calculated for a plurality of images, the environment map position adjustment unit 514 may calculate a given statistic an average value thereof as the adjustment value 526. Detailed contents of the calculation of the adjustment value 526 will be described later.

When calculating the adjustment value 526, in a case where the orientation of each image is also calculated, the environment map position adjustment unit 514 may use only an image having a small orientation difference as the adjustment value, or may use the orientation difference as a weight to obtain a weighted average such that the smaller the orientation difference, the higher the contribution. As described above, by calculating the adjustment value in consideration of the orientation difference, it is possible to remove the local position error of the GNSS and the orientation disturbance due to the estimation error of the position and orientation estimation unit 512 itself as much as possible and calculate the adjustment value 526 in consideration of the influence of the overall position error of the GNSS of the environment map 523.

In addition, the environment map position adjustment unit 514 may obtain a movement distance from the imaging position of the preceding and subsequent image frames for each image group for which the positional difference 525 is calculated. The movement distance may be calculated by referring to the imaging positions of the preceding and subsequent image frames in the position and orientation Ca 524a and the position and orientation Cb 524b using the same environment map 523 and obtaining a difference from the imaging position of the corresponding frame.

The environment map position adjustment unit 514 may select whether or not to use the positional difference 525 of each image for calculation of the adjustment value 526 based on the obtained movement distance. Alternatively, the adjustment value may be calculated using the movement distance as a weight of the positional difference of each of the images. For example, an adjustment value may be calculated such that the contribution rate increases as the movement distance increases.

Specifically, for example, the environment map position adjustment unit 514 may realize the function by the CPU 601 executing a program stored in the memory 602 in the server 501 illustrated in FIG. 6. In addition, specifically, for example, in the vehicle-mounted device 502 illustrated in FIG. 7, the function may be realized by the CPU 701 executing the program stored in the memory 702.

Content of Adjustment Value Calculation (Part 1)

FIG. 12 is an explanatory diagram illustrating an example of the contents of adjustment value calculation. FIG. 12 illustrates an example in which the movement distance between the preceding and subsequent images is used as a weight, as an example of calculation of the adjustment value 526 for correcting the value of the environment map B 523b to the value of the environment map A 523a in the environment map position adjustment unit 514.

FIG. 12 illustrates an example of the overhead bird's-eye view. In FIG. 12, among the images 0 to N+1 captured by the cameras 1200 to 1205, respectively, the images 1 to N captured by the cameras 1201 to 1204 are images of the overlapping section 1250 between the environment map A 523a and the environment map B 523b. The image 0 captured by the camera 1200 and the image N+1 captured by the camera 1205 are images outside the overlapping section 1250.

Each of the images 1 to N has estimated imaging positions Ca1 to CaN and Cb1 to CbN in the environment map A 523a, respectively. The movement distances L0 to Ln indicate differences between the imaging positions estimated in the environment map B and the preceding and subsequent images of the images 1 to N. Specifically, for example, a movement distance L1 between the image 1 and the image 2 may be obtained from the distance between the estimated imaging position Cb1 of the image 1 and the estimated imaging position Cb2 of the image 2 in the environment map B.

The adjustment value 526 of the environment map B 523b for the environment map A 523a in FIG. 12 may be obtained by, for example, the following formula (1), which is an average of the positional differences using the movement distance as a weight.

Since the adjustment value is the weighted average movement distance of the preceding and subsequent images of the position error of each image, $$\text{Adjustment value} = \frac{1}{S} \times \sum_{i=1}^{N} 0.5 \times (L_{i-1} + L_i) \times (Ca_i - Cb_i) \qquad (1)$$

Here, S may be expressed by the following formula (2).

$$S = \sum_{i=1}^{N} 0.5 \times (L_{i-1} + L_i) \qquad (2)$$

In addition, a movement distance L1 from the subsequent image (image 2 (Cb2)) on the image 1 (Cb1) in the environment map B 523b may be expressed by the following formula (3).

$$L_i = |Ca_{i+1} - Cb_i| \qquad (3)$$

Since the positional difference is any one of one value or a two-dimensional or three-dimensional value, the adjustment value 526 may also be any one of one value or a two-dimensional or three-dimensional value. In addition, when the adjustment value 526 is a two-dimensional value or a three-dimensional value, the movement distance Li may be calculated as each XYZ component value of the distance (each component of the positional difference used to calculate the distance itself) instead of one value (distance=norm) common to each of the two-dimensional components XY or each of the three-dimensional components XYZ. By calculating the movement distance for each component, the contribution ratio (weight) to the adjustment value may be changed for each component even when the weight of the same positional difference is used, and more detailed weight calculation may be realized.

As described above, by using the movement distance as the weight, it is possible to limit the contribution rate to the use and the adjustment value for an image in which there is substantially no movement distance which is likely to be stopped at the time of imaging. Then, the adjustment value 526 for correcting the positional deviation may be calculated by using images captured at various positions as much as possible.

In addition, by multiplying the above-described formula (1) by a distance (for example, 2 m) separately specified, the ratio of the actual movement distance to the specified distance (here, 2 m) may be used as the weight. As a result, it is possible to obtain the adjustment value 526 similar to the case where the adjustment value is obtained by the positional difference of the image group captured by the fixed speed movement of moving by the specified distance per one image in a pseudo manner. As a result, it is possible to obtain the adjustment value 526 in which the position error in the entire overlapping section 1250 is uniformly used without excessively emphasizing the position error correction at the point where the vehicle stops due to congestion or travels at a low speed in the overlapping section 1250.

Content of Adjustment Value Calculation (Part 2)

Another example of the content of the adjustment value calculation of the environment map position adjustment unit 514 is described. In this example, as the adjustment value 526, a given transformation between the coordinate system of the environment map A 523a and the coordinate system of the environment map B 523b is calculated. For example, a given affine transformation including a parallel movement and a linear transformation (enlargement, reduction, rotation, or the like) is defined, and the affine transformation is calculated to associate the estimated imaging positions of each of the images in the overlapping section in the environment map A 523a or the environment map B 523b with each other.

Specifically, for example, in a case where an adjustment value for a two-dimensional value of latitude and longitude is obtained, a two-dimensional affine transformation is calculated. The two-dimensional affine transformation may be described by the following formula (4) in a simultaneous coordinate system.

$$\begin{pmatrix} X' \\ Y' \\ 1 \end{pmatrix} = \begin{pmatrix} a & b & c \\ d & e & f \\ 0 & 0 & 1 \end{pmatrix} \begin{pmatrix} X \\ Y \\ 1 \end{pmatrix} \qquad (4)$$

When there are three or more images at different positions, an affine matrix may be obtained. Therefore, among the imaging positions of each of the images in the overlapping section of the environment map A 523a and the environment map B 523b, each of the imaging positions in the environment map A 523a are set as x and y, each of the imaging positions in the environment map B 523b are set as X' and Y', and the values are substituted into the above formula (4). Then, a to f, which are parameters of the affine transformation matrix, are calculated using a known method of solving simultaneous equations.

At this time, in order to obtain a correct solution, it is desirable to use images having different imaging positions. Therefore, in a case where the positional difference (Cb–Ca) 525 obtained by the position comparison unit 513 is 0 or a sufficiently small value, the imaging positions estimated by the environment map A 523a and the environment map B 523b may be regarded as the same and the positional difference (Cb–Ca) 525 may be omitted from the simultaneous equations. As described above, the positional difference 525 between the environment map A 523a and the environment map B 523b is not directly used in the affine matrix calculation, and the positional difference 525 may be used by omitting "same position"="imaging position with zero positional difference" in the simultaneous equations at the time of the calculation.

In addition, the affine transformation matrix obtained from three random images using given number of image positions may be used to compare the positions of the remaining images after the affine transformation with the pixel positions on the actual environment map B 523b, and the affine matrix may be obtained so that the position errors between these images are minimized.

As described above, by multiplying the position of a given image feature point group of the environment map B 523b by the calculated affine transformation matrix as a correction value, the position corrected to the position in the environment map A 523*a* may be calculated, and the position in the environment map B 523*b* may be corrected.

Note that, in a case where the adjustment value including the height is obtained, the affine transformation matrix including a height Z value and expanded to 4×4 three dimensions with one dimension increased may be used.

Content of Adjustment Value Calculation (Part 3)

As in the examples illustrated in the contents (Part 1) and (Part 2) of the adjustment value calculation, instead of calculating one adjustment values or one correction matrices for the environment map A 523*a* and the environment map B 523*b* as the adjustment values 526 of the environment map position adjustment unit 514, an adjustment value may be dynamically obtained for each image feature point of the environment map 523. In other words, in the content (Part 3) of the adjustment value calculation, an optimum adjustment value 526 for correcting the position of each image feature point is calculated for each image feature point.

FIG. 13 is an explanatory diagram illustrating another example of the content of adjustment value calculation, and illustrates an example of an overhead bird's-eye view. In FIG. 13, images 1 to N captured by the cameras 1301 to 1304, respectively, are images of the overlapping section 1350 between the environment map A 523*a* and the environment map B 523*b*. Each of the images 1 to N has estimated imaging positions Ca1 to CaN by the environment map A 523*a* and estimated imaging positions Cb1 to CbN by the environment map B 523*b*, respectively.

As illustrated in FIG. 13, an adjustment value for actually correcting the position of a certain image feature point P 1300 on the environment map B is calculated using the each position and the positional difference of each image. The image feature point P 1300 may be located outside the overlapping section 1350 between the environment map A 523*a* and the environment map B 523*b* as long as the image feature point P 1300 is a point inside the environment map B 523*b*.

The adjustment values of the following formulas (5) and (6), which are weighted averages of the positional differences of the environment map A 523*a* and the environment map B 523*b* of each image, are calculated using the weight by a distance li from the imaging position Cbi of each image in the environment map B 523*b* to the image feature point P 1300, for a position Pb in the environment map B 523*b* of the image feature point P 1300.

$$\text{Adjustment value} = \frac{1}{S} \times \sum_{i=1}^{N} li \times (Ca_i - Cb_i) \quad (5)$$

Here, S may be expressed by the following formula (6).

$$S = \sum_{i=1}^{N} li \quad (6)$$

As described above, by adding the adjustment value 526 to the position of the image feature point P 1300 in the environment map B 523*b*, a corrected position in which the position error is adjusted to the environment map A 523*a* may be calculated. Note that, similarly to the adjustment value in FIG. 12, the distance li may be decomposed into two-dimensional or three-dimensional components, and the adjustment value for each component may be calculated and used.

The environment map position adjustment unit 514 outputs the adjustment value 526 calculated from the positional difference 525 in this manner. For example, when the environment map 523 is used, the adjustment value 526 may be output and held as an offset value for correcting the three-dimensional position.

Note that, instead of outputting the adjustment value 526, the environment map position adjustment unit 514 may correct and change the three-dimensional position of the environment map 523 actually using the adjustment value 526 and output the corrected and changed position, and may substitute the corrected and changed position for the output of the adjustment value 526 itself.

In addition, the environment map position adjustment unit 514 may separately hold a history that the position correction of the environment map A 523*a* and the environment map B 523*b* are completed in a database (not illustrated) or the like. For example, the environment maps 523 for which the position errors are corrected are referred to by holding a history indicating that the position errors are corrected, so that the environment maps 523 which are corrected once may be easily excluded from the subsequent determination of the target selection unit 1001, and the processing of the target selection unit 1001 may be made efficient.

In addition, the processing of the environment map position adjustment unit 514 may be performed when the environment map 523 is actually used, and the processing result up to the position comparison unit 513 may be held together with the environment map 523.

Processing Procedure of Environment Map Adjustment Value Calculation Method

Figure 14:
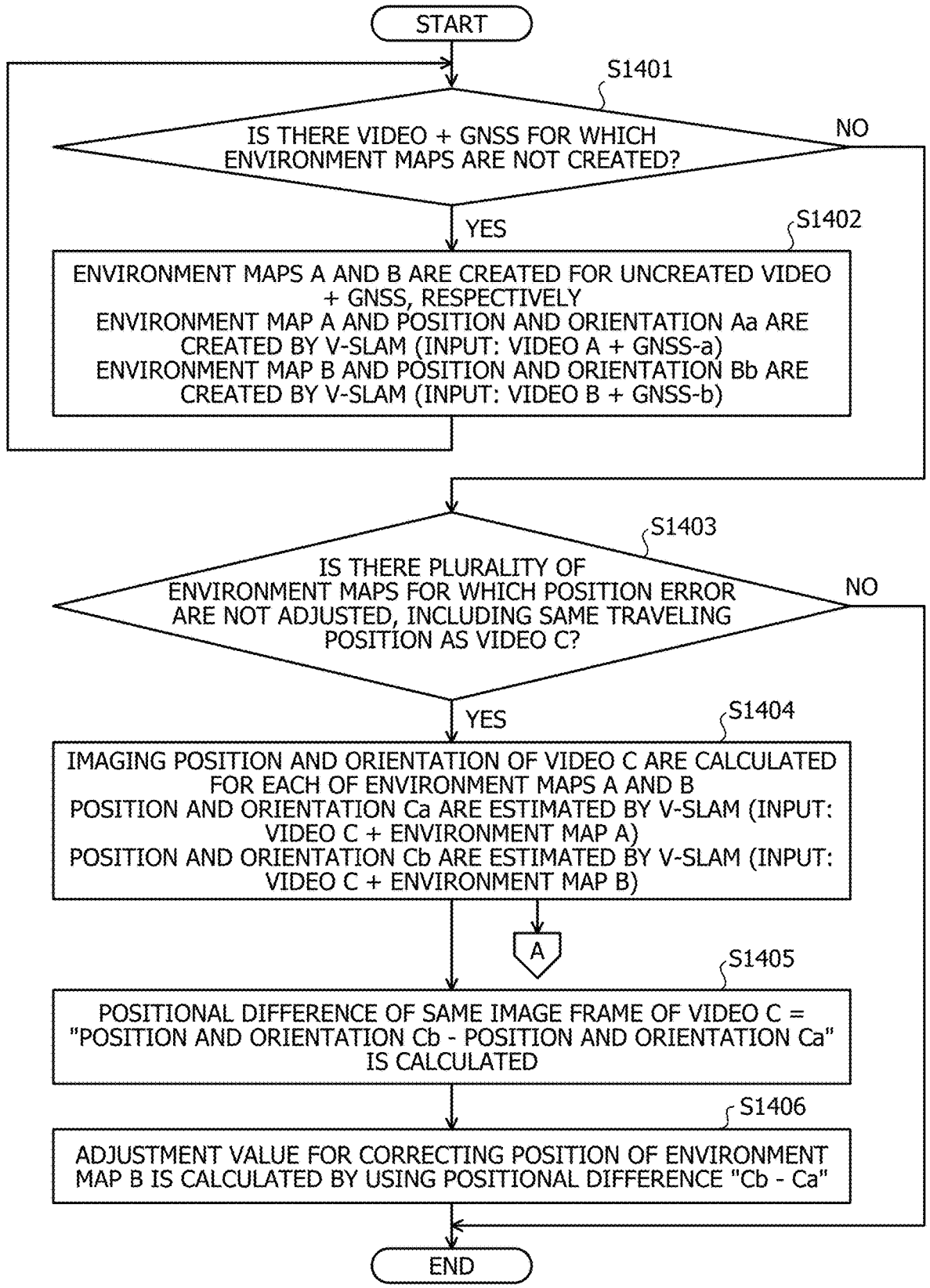
FIG. 14 is a flowchart illustrating an example of a procedure of processing of an environment map adjustment value calculation method (First Embodiment)

FIG. 14 is a flowchart illustrating an example of a procedure of processing of an environment map adjustment value calculation method (First Embodiment). In the flowchart of FIG. 14, it is determined whether or not there is a video and a GNSS for which environment maps are not created (Step S1401).

In Step S1401, in a case where there is the video and the GNSS for which the environment maps are not created (Step S1401: Yes), an environment map A 523*a* and an environment map B 523*b* are created for the uncreated video and the GNSS, respectively (Step S1402). Specifically, as illustrated in FIG. 9, the environment map A 523*a* and a position and orientation Aa 901*a* are created by V-SLAM for which the input is the video A 522*a*+the GNSS-a 521*a*. Similarly, the environment map B 523*b* and a position and orientation Bb 901*b* are created by the V-SLAM for which the input is the video B 522*b*+GNSS-b 521*b*.

Thereafter, the process returns to Step S1401. Then, in Step S1401, in a case where the video and the GNSS for which the environment maps are not created are disappeared (Step S1401: No), it is next determined whether or not there are a plurality of environment maps for which a position error are not adjusted, including the same traveling position as the video C 522*c* (Step S1403). Specifically, as illustrated in FIG. 10, the target selection unit 1001 makes the determination based on the GNSS-c 521*c*, the position and orientation Aa 901*a*, and the position and orientation Bb 901*b*. Here, in a case where there is no environment map for which the position error is not adjusted (Step S1403: No), a series of processing is terminated.

On the other hand, in Step S1403, in a case where there is an environment map for which the position error is not adjusted (Step S1403: YES), the imaging position and orientation of the video C 522c are calculated for the environment map A 523a and the environment map B 523b (Step S1404). More specifically, as illustrated in FIG. 10, the position and orientation (imaging position) Ca 524a are estimated (calculated) by the V-SLAM for which the input is the video C 522c+the environment map A 523a. Similarly, the position and orientation (imaging position) Cb 524b are estimated (calculated) by the V-SLAM for which the input is the video C 522c+the environment map B 523b. Note that, a reference numeral A indicating a branch destination from Step S1404 is coupled to FIG. 17 (Second Embodiment).

Next, the positional difference 525 of the same image frame of the video C 522c="position and orientation (imaging position) Cb−position and orientation (imaging position) Ca" is calculated (Step S1405). Then, an adjustment value 526 for correcting the position of the environment map B 523b is calculated by using the positional difference ("Cb−Ca") 525 calculated in Step S1405 (Step S1406). Specifically, this is as illustrated in FIG. 11. As a result, a series of processing is terminated.

In the flowchart of FIG. 14, for the sake of convenience, an example is illustrated in which the process proceeds to the next target selection unit 1001 after the environment map 523 is created by the environment map creation unit 511 for all video and GNSS information, and in practice, the processing of the target selection unit 1001 (Step S1403) may be performed during the processing of creating the environment map 523 (Step S1402).

The execution servers and the execution frequencies of the environment map creation unit 511 and the target selection unit 1001 may be different from each other. The processing (Step S1403) in the target selection unit 1001 may be executed by preparing to create the environment map group by executing the processing (Step S1402) in the environment map creation unit 511 in advance on another server, and referring to the environment map group at a given timing such as acquisition of a new video. In addition, since the processing (Step S1403) in the target selection unit 1001 requires an environment map for traveling at the same traveling position, unrequired processing may be suppressed by executing the processing after accumulating the environment map to some extent.

As described above, according to First Embodiment, for example, for a plurality of environment maps having different position errors due to a GNSS position error, it is possible to estimate and correct a positional deviation between the environment maps by using the videos captured at the imaging positions included in both maps. As a result, it is possible to remove the estimated position gap in the case of using a plurality of environment maps, and realize the same smooth position estimation result as that of a single environment map. Therefore, it is possible to seamlessly couple the environment maps of a plurality of V-SLAM, and to use the environment maps across a plurality of maps (imaging position and orientation estimation).

As described above, the imaging position and orientation estimation by the V-SLAM may be performed by using the normal GPS having a large position error and irregularity without using the GPS having a significantly high position accuracy such as a surveying vehicle. As a result, it is possible to use not the data of the surveying vehicle but the data of the regular vehicle which may be collected in a large amount at a lower cost as the data used for the environment map maintenance for the V-SLAM.

Second Embodiment

Figure 15:
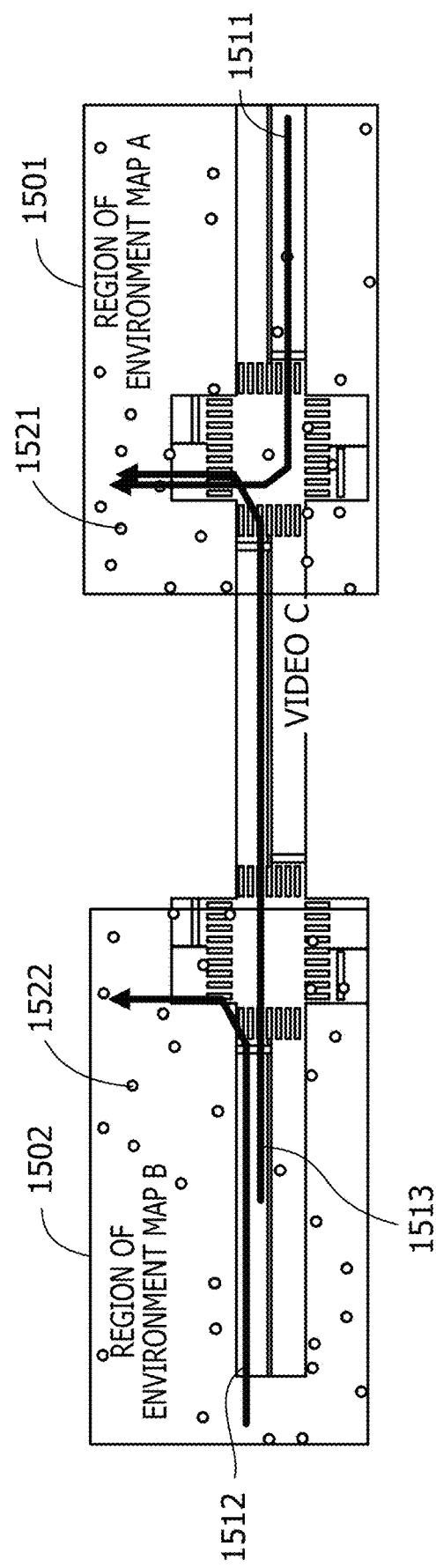
FIG. 15 is an explanatory diagram schematically illustrating another example of the relationship between the environment map and the video (Second Embodiment)

FIG. 15 is an explanatory diagram schematically illustrating another example of the relationship between the environment map and the video (Second Embodiment). In FIG. 15, similarly to First Embodiment illustrated in FIG. 4, as another example of the video A, the video B, and the video C, an example of the environment map A and the environment map B created from a traveling route at the time of imaging each video, the video A, and the video B are schematically illustrated by using an overhead bird's-eye view.

In FIG. 15, a region 1501 of the environment map A indicates the existence range of the 3D position of the image feature point applied to the video A, and a region 1502 of the environment map B indicates the existence range of the 3D position of the image feature point applied to the video B. The circle in the region 1501 of the environment map A including the reference numeral 1521 indicates the image feature point 3D position of the environment map A, and the circle in the region 1502 of the environment map B including the reference numeral 1522 indicates the image feature point 3D position of the environment map B. In addition, an arrow 1511 indicates a traveling route of the video A when the environment map A is created, and an arrow 1512 indicates a traveling route of the video B when the environment map B is created. In addition, an arrow 1513 indicates a traveling route of the video C.

As illustrated in the overhead bird's-eye schematic view of FIG. 15, unlike First Embodiment illustrated in FIG. 4, the environment map AB itself does not include an overlapping section that travels at the same position. On the other hand, the video C travels at the same position in the overlapping section between the environment map B and the video C. In addition, the video C travels at the same position in the overlapping section between the environment map A and the video C. As described above, the video C has different overlapping sections for the environment maps A and B, respectively. In Second Embodiment, an environment map adjustment value for correcting the environment map B according to the position of the environment map A is calculated by using a video C including a video which does not include a position included in both of the environment maps A and B and travels at a position included in both of the environment maps A and B for the two environment maps A and B.

In Second Embodiment, similarly to First Embodiment, the server 501 includes the environment map creation unit, the position and orientation estimation unit, the position comparison unit, and the environment map position adjustment unit. Second Embodiment further includes a GNSS position adjustment unit 1602 and an environment map update unit 1603 illustrated in FIG. 16A. In addition, two position comparison units, a first position comparison unit 1601 illustrated in FIG. 16A and a second position comparison unit 1604 illustrated in FIG. 16B are included. Although not illustrated, at least one of these functional units may be included in the vehicle-mounted device 502, in addition to the server 501, or instead of the server 501. In a case where the vehicle-mounted device 502 includes at least one of the functional units 1601, 1602, 1603, 1604, and 1605, the contents of the processing performed by the server 501 may be the same.

Figure 16A:
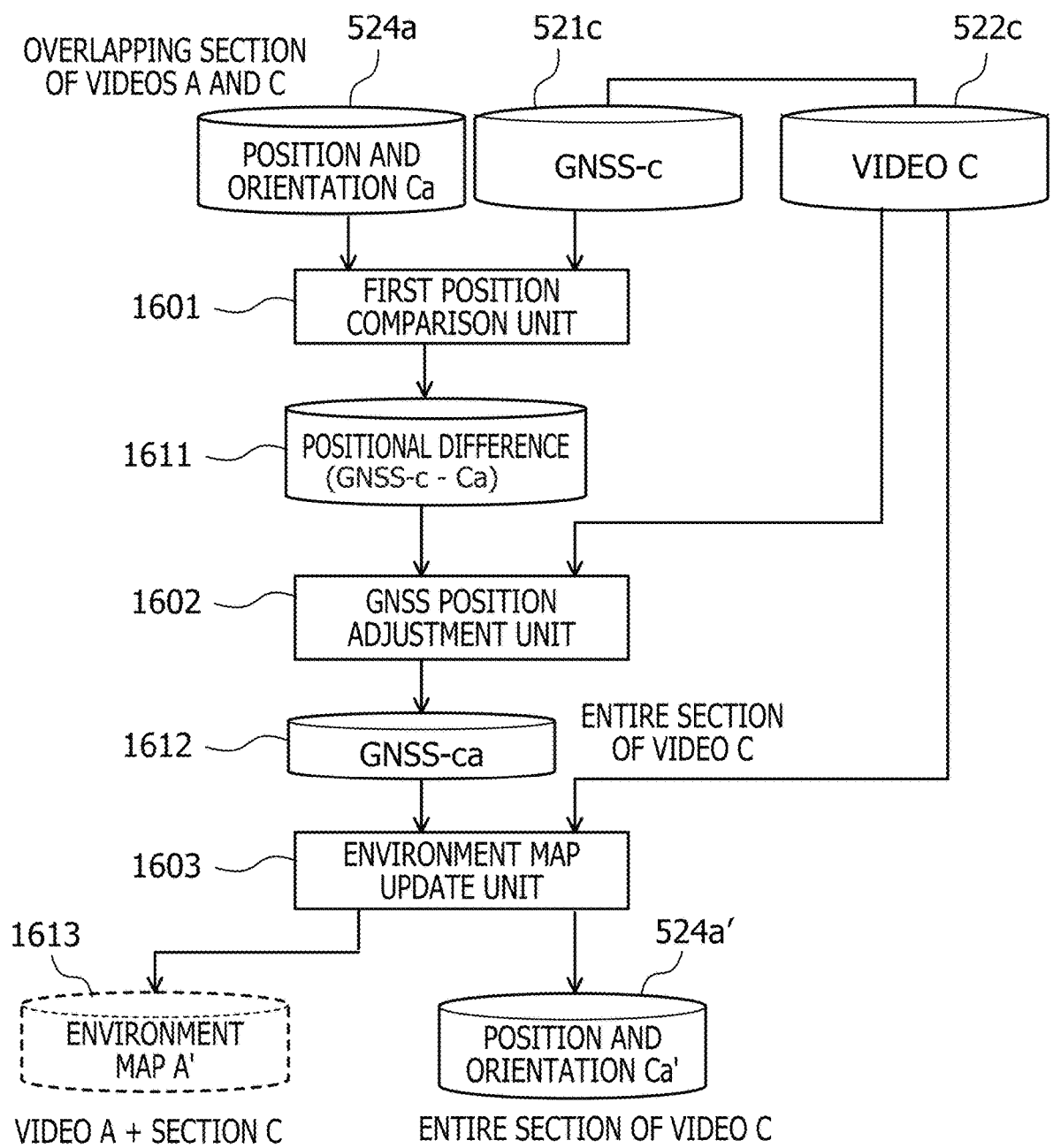
FIG. 16A is an explanatory diagram illustrating an example of the contents of a first position comparison unit, a GNSS position adjustment unit, and an environment map update unit (Second Embodiment)
Figure 16B:
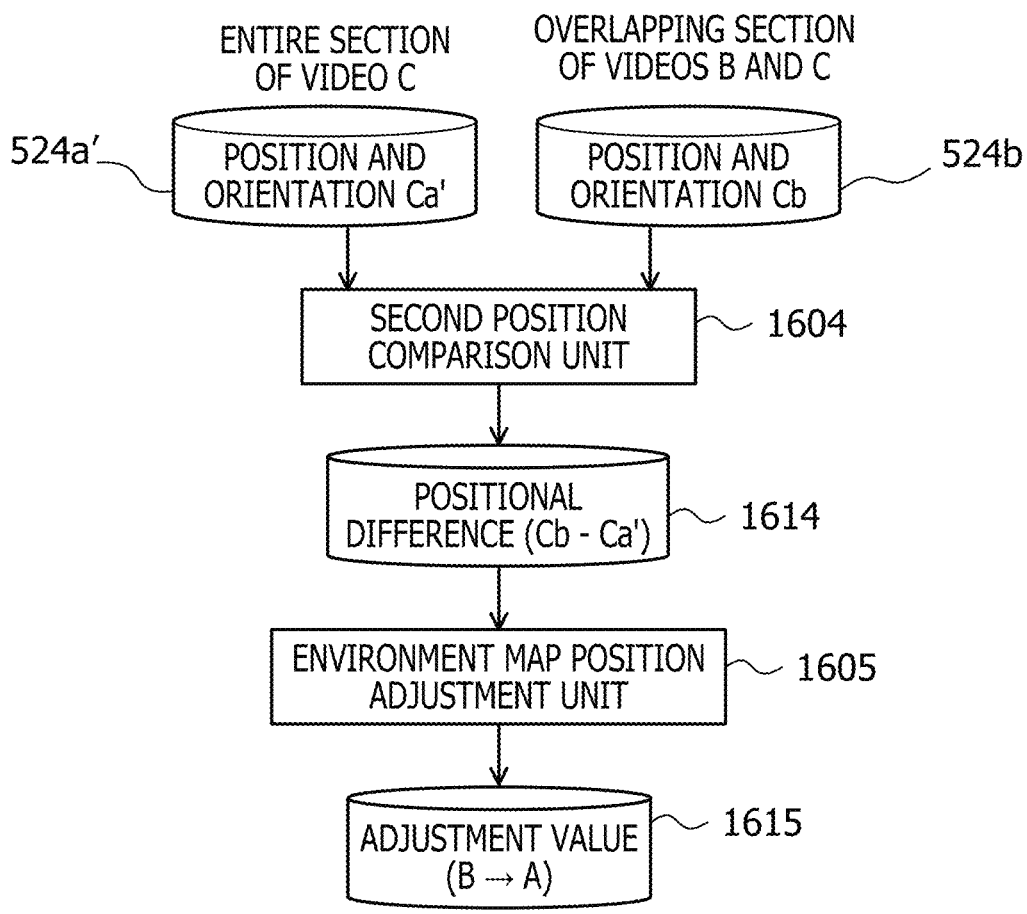
FIG. 16B is an explanatory diagram illustrating an example of the contents of a second position comparison unit and an environment map position adjustment unit (Second Embodiment)

FIG. 16A is an explanatory diagram illustrating an example of the contents of a first position comparison unit, a GNSS position adjustment unit, and an environment map update unit (Second Embodiment). In addition, FIG. 16B is an explanatory diagram illustrating an example of the contents of the second position comparison unit and the environment map position adjustment unit (Second Embodiment). Note that, since the environment map creation unit according to Second Embodiment has the same configuration contents as that of the environment map creation unit 511 according to First Embodiment illustrated in FIG. 9, illustration and description thereof are omitted. In addition, since the target selection unit and the position and orientation estimation unit in Second Embodiment have the same configuration contents as those of the target selection unit 1001 and the position and orientation estimation unit 512 in First Embodiment illustrated in FIG. 10, illustration and description thereof are also omitted.

In FIG. 16A, the first position comparison unit 1601 is a processing unit that compares the position and orientation Ca 524a of the video C 522c estimated by the position and orientation estimation unit 512 using the environment map A 523a with the value of the GNSS-c 521c acquired together with the video C 522c, and calculates a positional difference (GNSS-c−Ca) 1611 that is a positional difference value for the same image.

In order to obtain a more accurate positional difference value (positional difference 1611) in this position comparison, the first position comparison unit 1601 may interpolate the value of the GNSS-c 521c, which is normally low in acquisition frequency such as one second intervals as compared with the frame rate of the video in advance by a given interpolation method to calculate the position in the GNSS for each image of the video C 522. Detailed contents of the interpolation of the GNSS value will be described later (refer to FIGS. 18 and 19).

Specifically, for example, the first position comparison unit 1601 may realize the function by the CPU 601 executing a program stored in the memory 602 in the server 501 illustrated in FIG. 6. In addition, specifically, for example, in the vehicle-mounted device 502 illustrated in FIG. 7, the function may be realized by the CPU 701 executing the program stored in the memory 702.

In FIG. 16A, the GNSS position adjustment unit 1602 is a processing unit for adjusting the position of the GNSS-c 521c for the video C 522 according to the position of the environment map A 523a. Specifically, the GNSS position adjustment unit 1602 calculates an adjustment value for adjusting the position of the GNSS-c 521c for the video C 522 to the position of the environment map A 523a using the positional difference 1611 calculated by the first position comparison unit 1601. Then, the positions of the GNSS-c 521c and the interpolated GNSS-c 521c are actually corrected by the calculated adjustment value, and the corrected GNSS-equivalent value GNSS-ca 1612 is output.

At this time, similarly to the environment map position adjustment unit 514 of First Embodiment, the GNSS position adjustment unit 1602 may calculate one correction value for correcting each position group of the GNSS-c 521c of the video C 522c to the environment map A 523a, or may perform correction so as to calculate an adjustment value for each value of the GNSS-c 521c.

Here, as illustrated in FIG. 12, the GNSS position adjustment unit 1602 may obtain one correction value using the positional difference of the overlapping section between the video C 522c and the environment map A 523a. In addition, the GNSS position adjustment unit 1602 may obtain an affine matrix which is one adjustment value from the affine transformation formula as illustrated in above formula (4). In addition, as illustrated in FIG. 13, the GNSS position adjustment unit 1602 may calculate an adjustment value for each value of GNSS-c 521c by using a distance weight of a position error or the like, regardless of whether or not it is an overlapping section the video C 522c and the environment map A 523a. In other words, the estimated imaging position Cb by the environment map B in FIGS. 12 and 13 may be replaced with GNSS-c to perform the processing.

Specifically, for example, the GNSS position adjustment unit 1602 may realize the function by the CPU 601 executing a program stored in the memory 602 in the server 501 illustrated in FIG. 6. In addition, specifically, for example, in the vehicle-mounted device 502 illustrated in FIG. 7, the function may be realized by the CPU 701 executing the program stored in the memory 702.

In FIG. 16A, the environment map update unit 1603 is a processing unit that inputs the video C 522c and the GNSS-ca 1612 corrected by the adjustment value of the GNSS position adjustment unit 1602, and outputs each imaging position and orientation Ca' 524a' of the video C 522c. Specifically, for example, the environment map update unit 1603 performs the same processing as that of the above-described environment map creation unit (environment map creation unit 511 in First Embodiment (refer to FIG. 9)), and outputs the position and orientation Ca' 524a'.

In addition, the environment map update unit 1603 may output the environment map A' 1613. At this time, although not illustrated, the existing environment map A 523a may also be input to the environment map update unit 1603 so that only the shortage of the environment map A 523a may be newly generated and updated as the environment map A' 1613 and used. Note that, the environment map A' 1613 used for the imaging position and orientation estimation is only stored as internal data of the environment map update unit 1603 and it may not be required to output the environment map A' 1613.

Since the GNSS-ca 1612 position-corrected so as not to have a position error with the environment map A 523a is input, the environment map update unit 1603 may calculate the environment map A' 1613 and the imaging position and orientation Ca' 524a' having the same position error with the environment map A 523a for the entire traveling route (entire image) of the video C 522c. As a result, even in a section newly overlapping the region 1502 of the environment map B in FIG. 15, the imaging position and orientation Ca' 524a' estimated from the environment map A' 1613 having a position error equivalent to that of the region 1501 of the environment map A may be obtained.

Specifically, for example, the environment map update unit 1603 may realize the function by the CPU 601 executing a program stored in the memory 602 in the server 501 illustrated in FIG. 6. In addition, specifically, for example, in the vehicle-mounted device 502 illustrated in FIG. 7, the function may be realized by the CPU 701 executing the program stored in the memory 702.

As described above, the first position comparison unit 1601, the GNSS position adjustment unit 1602, and the environment map update unit 1603 may adjust the position and orientation Ca 524a and the position and orientation Cb 524b of the video C 522c estimated based on the information on the environment map A 523a or the environment map B 523b by using the positioning information (GNSS-c 521c) of the video C 522c.

In FIG. 16B, the second position comparison unit 1604 is a processing unit that compares the position and orientation Ca' 524a' output by the environment map update unit 1603 in FIG. 16A with the position and orientation Cb 524b of the video C 522c estimated by the position and orientation estimation unit (position and orientation estimation unit 512 in First Embodiment (refer to FIG. 10)).

The second position comparison unit 1604 searches for an estimated position and orientation of the same image for which the position and orientation are obtained, which is included in both the position and orientation Ca' 524a' and the position and orientation Cb 524b, and calculates a positional difference (Cb−Ca') 1614 of the same image. As described above, the position and orientation Ca' 524a' may be calculated for all the images of the video C 522c, and the position and orientation Cb 524b are calculated substantially only for the images in the overlapping section with the environment map B 523b.

Specifically, for example, the second position comparison unit 1604 may realize the function by the CPU 601 executing a program stored in the memory 602 in the server 501 illustrated in FIG. 6. In addition, specifically, for example, in the vehicle-mounted device 502 illustrated in FIG. 7, the function may be realized by the CPU 701 executing the program stored in the memory 702.

In addition, In FIG. 16B, the environment map position adjustment unit 1605 is a processing unit that calculates an adjustment value 1615 for correcting positional deviation between the environment maps 523. The environment map position adjustment unit 1605 calculates the adjustment value (B→A) 1615 by using the imaging positional difference (Cb−Ca') 1614 of each image in the overlapping section between the video C and the environment map B calculated by the second position comparison unit 1604.

The method of calculating and correcting the adjustment value 1615 using the positional difference 1614 may also use the same processing as that of the environment map position adjustment unit 514 illustrated in First Embodiment and the GNSS position adjustment unit 1602 illustrated in Second Embodiment. In other words, as illustrated in FIG. 12, the environment map position adjustment unit 1605 may obtain one correction value using the positional difference between the overlapping sections of the environment map A 523a and the environment map B 523a. In addition, the environment map position adjustment unit 1605 may obtain an affine matrix which is one adjustment value from the affine transformation formula as illustrated in above formula (4). In addition, as illustrated in FIG. 13, the environment map position adjustment unit 1605 may calculate the adjustment value for actually correcting the position of a certain image feature point P 1300 on the environment map B by using the position and the positional difference of each image.

Since the imaging positional difference is a difference between the estimated imaging position by the environment map B and the estimated imaging position by the environment map A for the same image, the adjustment value is a value for adjusting the environment map B to the position error of the environment map A. The environment map position adjustment unit 1605 may output this adjustment value, or may output an environment map B' obtained by actually correcting the environment map B 523b as an environment map having the same position error as that of the environment map A 523a by using the adjustment value 1615. In other words, similarly to the environment map position adjustment unit 514 of First Embodiment, the adjustment value 1615 may be held as an offset value for correcting the three-dimensional position coordinates of the image feature point group of the environment map B 523b, or the three-dimensional position coordinates of the image feature point group may be actually corrected as the environment map B'.

Note that, in Second Embodiment, for the sake of convenience, the environment map A 523a is used in the first position comparison unit 1601, the GNSS position adjustment unit 1602, and the environment map update unit 1603. Instead of this, the processing of obtaining the positional difference (GNSS-c−Cb) by using the environment map B 523b in the first position comparison unit 1601, obtaining the GNSS-cb by correcting the GNSS-c 521c in the GNSS position adjustment unit 1602, obtaining the GNSS-cb and, if required, the position and orientation Cb' by inputting the environment map B' in the environment map update unit 1603, and obtaining the positional difference (Cb'−Ca) in the second position comparison unit 1604 may be performed.

Specifically, for example, the environment map position adjustment unit 1605 may realize the function by the CPU 601 executing a program stored in the memory 602 in the server 501 illustrated in FIG. 6. In addition, specifically, for example, in the vehicle-mounted device 502 illustrated in FIG. 7, the function may be realized by the CPU 701 executing the program stored in the memory 702.

As described above, the processing after the second position comparison unit 1604 illustrated in FIG. 16B (in other words, processing of the second position comparison unit 1604 and processing of the environment map position adjustment unit 1605) may be substantially the same processing as each processing (processing of the position comparison unit 513 and processing of the environment map position adjustment unit 514) in First Embodiment illustrated in FIG. 11. Therefore, when the position and orientation Ca' 524a' and the environment map A' 1613 calculated through the first position comparison unit 1601, the GNSS position adjustment unit 1602, and the environment map update unit 1603 illustrated in FIG. 16A are regarded as the result (position and orientation Ca 524a) calculated by the position and orientation estimation unit 512 illustrated in FIG. 10, the processing in First Embodiment may be used as it is.

Processing Procedure of Environment Map Adjustment Value Calculation Method

Figure 17:
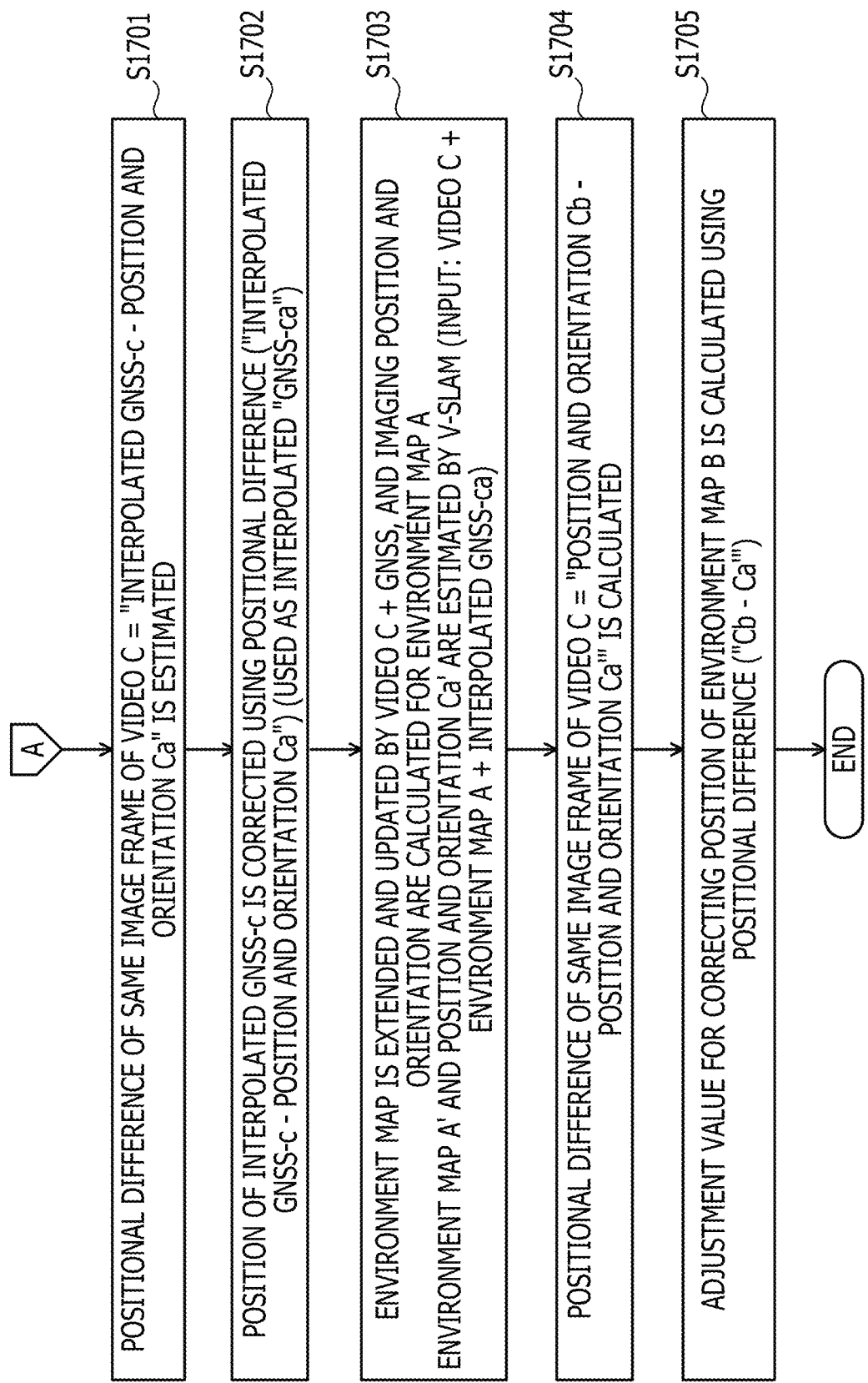
FIG. 17 is a flowchart illustrating another example of the procedure of processing of an environment map adjustment value calculation method (Second Embodiment)

FIG. 17 is a flowchart illustrating another example of the procedure of processing of the environment map adjustment value calculation method (Second Embodiment). Since the environment map adjustment value calculation method according to Second Embodiment performs the same processing in Steps S1401 to S1404 in the flowchart illustrated in FIG. 14 in the environment map adjustment value calculation method according to First Embodiment, description of these Steps S1401 to S1404 is omitted in the flowchart illustrated in FIG. 17.

In the flowchart of FIG. 17, after the processing of Step S1404 in the flowchart of FIG. 14, the positional difference 1611 of the same image frame of the video C 522c="interpolated GNSS-c−position and orientation (imaging position) Ca" is estimated (Step S1701). Next, the position of the interpolated GNSS-c is corrected using the positional difference ("interpolated GNSS-c−position and orientation (imaging position) Ca") 1611 estimated in Step S1701 (Step S1702). Then, the corrected position of the interpolated GNSS-c is used as an interpolated "GNSS-ca" 1612.

Next, the environment map is extended and updated by the video C 522c+GNSS-ca 1612, and the imaging position and orientation are calculated for the environment map A 523a. The environment map A' 1613 and the position and orientation (imaging position) Ca' 524a' are estimated by the V-SLAM (input: video C 522c+environment map A 523a+interpolated GNSS-ca 1612) (Step S1703).

Thereafter, the positional difference 1614 of the same image frame of the video C 522c="position and orientation (imaging position) Cb−position and orientation (imaging position) Ca'" is calculated (Step S1704). Then, an adjustment value 1615 for correcting the position of the environment map B 523b is calculated using the positional difference ("Cb−Ca'") 1614 calculated in Step S1704 (Step S1705). Specifically, it is as illustrated in FIG. 16B. As a result, a series of processing is terminated.

Contents of GNSS Value Interpolation

Figure 18:
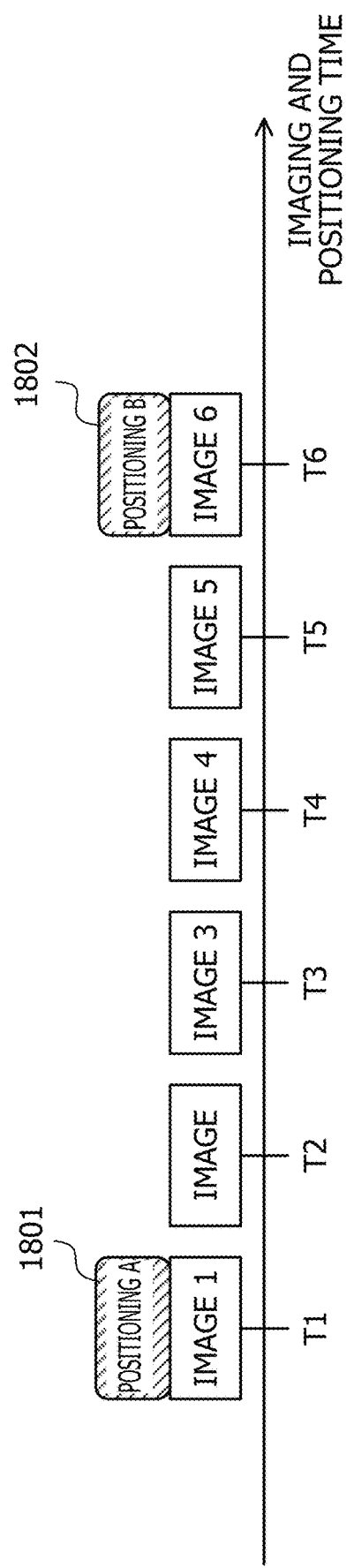
FIG. 18 is an explanatory diagram illustrating an example of the contents of GNSS value interpolation.
Figure 19:
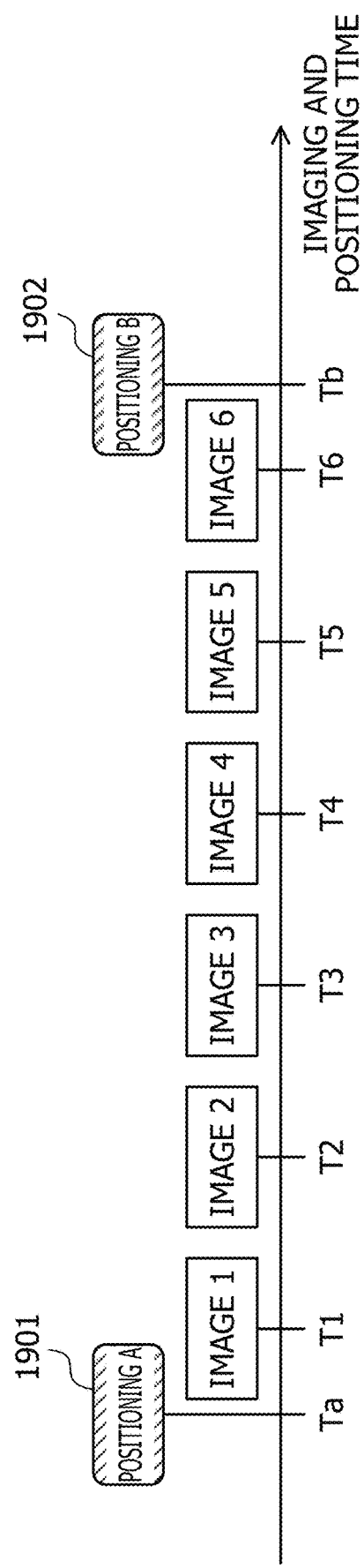
FIG. 19 is an explanatory diagram illustrating another example of the contents of GNSS value interpolation.

Next, the specific contents of the interpolation of the GNSS value in the first position comparison unit 1601 will be described. FIGS. 18 and 19 are explanatory diagrams illustrating an example of the contents of the GNSS value interpolation. Here, the first position comparison unit 1601 compares the positioning time of the GNSS-c 521c with the imaging time of each image, and acquires the weighted average with the time difference as a weight, using the positioning value of GNSS-c 521c ("Pa" and "Pb" which are the preceding and subsequent positions of the two positioning) obtained at the positioning timing in the vicinity of the image.

FIG. 18 illustrates an example of a case where the image imaging time and the positioning time are the same as each other, as an example of interpolation using the time difference. In FIG. 18, the imaging time of the image 1 illustrates "T1", the imaging time of the image 2 illustrates "T2", . . . , and the imaging time of the image 6 illustrates "T6". In other words, the images 1 to 6 are illustrated in the time-series, it is illustrated that the image 1, the image 2, . . . , and the image 6 are captured in this order.

The positioning time of the positioning A 1801 coincides with the imaging time "T1" of the image 1. Similarly, the positioning time of the positioning B 1802 coincides with the imaging time "T6" of the image 6. Here, when the position P1 of the positioning A 1801 is a position Pa (P1=Pa) at the same time as T1, and the position P6 of the positioning B 1802 is a position Pb (P6=Pb) at the same time as T6, the position P3 of the image 3 may be expressed by the following formula (7).

$$P3 = \frac{(T2-T1)}{(T6-T1)} \times (Pb - Pa) + Pa \quad (7)$$

In addition, FIG. 19 illustrates an example of a case where the image imaging time and the positioning time are different from each other, as an example of the interpolation using the time difference. In FIG. 19, similarly to FIG. 18, the imaging time of the image 1 illustrates "T1", the imaging time of the image 2 illustrates "T2", . . . , and the imaging time of the image 6 illustrates "T6". In other words, the images 1 to 6 are illustrated in the time-series, it is illustrated that the image 1, the image 2, . . . , and the image 6 are captured in this order.

Here, the positioning time of the positioning A 1901 is "Ta", and "Ta" does not coincide with the imaging time "T1" of the image 1. Similarly, the positioning time of the positioning B 1902 is "Tb", and "Tb" does not coincide with the imaging time "T6" of the image 6. Here, when the position of the positioning A 1901 is Pa and the position of the positioning B 1802 is Pb, the position P3 of the image 3 may be expressed by the following formula (8).

$$P3 = \frac{(T2-Ta)}{(Tb-Ta)} \times (Pb - Pa) + Pa \quad (8)$$

As described above, in the first position comparison unit 1601, in order to obtain a more accurate positional difference value (positional difference 1611) in this position comparison, the value of the GNSS-c 521c having a low acquisition frequency may be interpolated by the above-described interpolation method, for example, and the position in the GNSS for each image of the video C 522 may be calculated.

As described above, according to Second Embodiment, for a plurality of environment maps having different position errors due to GNSS position errors, even when there is no video captured at a imaging position simultaneously included in both environment maps, when there is one video in which the image captured at the imaging position included in each map is present somewhere in the video, the positional deviation between the environment maps may be estimated and corrected through the video. As a result, it is possible to more easily realize a smooth position estimation without an estimated position gap using a plurality of environment maps.

Note that, the environment map adjustment value calculation method described in the present embodiment may be realized by executing a prepared program in advance on a computer such as a personal computer or a workstation. The program delivery program is recorded on a computer-readable recording medium such as a hard disk, a flexible disk, a compact disc (CD)-ROM, a magneto-optical disk (MO), a digital versatile disk (DVD), a Universal Serial Bus (USB) memory and the like, and is executed by being read from the recording medium by the computer. In addition, the environment map adjustment value calculation program may be distributed via a network such as the Internet. Referring to FIG. 3, the environment map A 305a of the V-SLAM is created based on the feature point 303a of the image in the video captured by the vehicle-mounted camera 302a of the regular vehicle 301a and the position of the camera obtained by positioning of the GNSS satellite 300. The environment map B 305b of the V-SLAM is created from the video captured by the vehicle-mounted camera 302b of the regular vehicle 301b different from the regular vehicle 301a. The position and orientation A 306a estimated based on the environment map A 305a and the position and orientation B 306b estimated based on the environment map B 305b are compared with each other, and the positional difference 307 between the images of the environment map A 305a and the environment map B 305b is obtained. The adjustment value 308 for adjusting a position error (deviation) between the environment map A 305a and the environment map 305b may be calculated based on the positional difference 307, and the position error of the environment map A 305a or the environment map 305b may be corrected based on the adjustment value 308. With this configuration, the position error occurring in the environment map may be adjusted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable storage medium having stored therein a program for causing a processor to execute a process, the process comprising:
    obtaining a first environment map created based on a feature of a given image among captured first time-series images and a second environment map created based on a feature of a given image among second time-series images captured separately from the first time-series images;

comparing a position of an image related to a position and orientation calculated based on information on the first environment map with a position of an image related to a position and orientation calculated based on information on the second environment map; and calculating an adjustment value for adjusting a difference between the first environment map and the second environment map based on a result of the comparing, the calculating of the adjustment value including one or more operations from a set of operations, the set of operations comprising:

calculating the adjustment value based on a positional difference between a position of an image related to a position and orientation of a third time-series image calculated based on the information on the first environment map and a position of an image related to a position and orientation of the third time-series image calculated based on the information on the second environment map, the third time-series image including an imaging location of the first time-series image and an imaging location of the second time-series image;

calculating the adjustment value by using a positional difference between a position of the image in the first environment map and a position of the image in the second environment map, and a positional difference between images used for calculating the positional difference;

calculating the adjustment value using a positional difference between a position of the image in the first environment map and a position of the image in the second environment map to select a plurality of images having the positional difference equal to or larger than a specified value, and obtains a spatial transformation matrix using a position of a selected image group to calculates the adjustment value; and calculating the adjustment value using a positional difference between a position of the image in the first environment map and a position of the image in the second environment map, and a positional difference between a position of an image used for calculating the positional difference and a three-dimensional position of a given image feature included in the environment map.

2. The non-transitory, computer-readable storage medium according to claim 1, wherein the processor, by the program, adjusts the position and orientation of the third time-series image calculated based on the information on the first environment map or the second environment map by using positioning information on the third time-series image.

3. The non-transitory, computer-readable storage medium according to claim 1, wherein the first environment map and the second environment map include position information on an image feature in a space.

4. The non-transitory, computer-readable storage medium according to claim 3, wherein the position information is information related to a position in a real coordinate system for the image feature associated with one point in the space.

5. The non-transitory, computer-readable storage medium according to claim 1, wherein the processor, by the program, stores information related to the calculated adjustment value in association with at least one of the first environment map and the second environment map.

6. The non-transitory, computer-readable storage medium according to claim 1, wherein the first time-series image and the second time-series image are obtained by an image sensor of a moving object.

7. A method performed by a computer, the method comprising:

adjusting a difference between a first environment map created based on a feature of a given image among captured first time-series images and a second environment map created based on a feature of a given image among second time-series images captured separately from the first time-series images;

comparing a position of an image related to a position and orientation calculated based on information on the first environment map with a position of an image related to a position and orientation calculated based on information on the second environment map, and calculating an adjustment value for adjusting a difference between the first environment map and the second environment map based on a result of the comparison, the calculating of the adjustment value including one or more operations from a set of operations, the set of operations comprising:

calculating the adjustment value based on a positional difference between a position of an image related to a position and orientation of a third time-series image calculated based on the information on the first environment map and a position of an image related to a position and orientation of the third time-series image calculated based on the information on the second environment map, the third time-series image including an imaging location of the first time-series image and an imaging location of the second time-series image;

calculating the adjustment value by using a positional difference between a position of the image in the first environment map and a position of the image in the second environment map, and a positional difference between images used for calculating the positional difference;

calculating the adjustment value using a positional difference between a position of the image in the first environment map and a position of the image in the second environment map to select a plurality of images having the positional difference equal to or larger than a specified value, and obtains a spatial transformation matrix using a position of a selected image group to calculates the adjustment value; and calculating the adjustment value using a positional difference between a position of the image in the first environment map and a position of the image in the second environment map, and a positional difference between a position of an image used for calculating the positional difference and a three-dimensional position of a given image feature included in the environment map.

* * * * *